United States Patent
Akagi

(10) Patent No.: US 9,658,559 B2
(45) Date of Patent: May 23, 2017

(54) IMAGE FORMING APPARATUS THAT FORMS IMAGE USING A PLURALITY OF LIGHT BEAMS

(71) Applicant: CANON KABUSHIKI KAISHA, Tokyo (JP)

(72) Inventor: Daisuke Akagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/710,335

(22) Filed: May 12, 2015

(65) Prior Publication Data
US 2015/0338765 A1   Nov. 26, 2015

(30) Foreign Application Priority Data

May 21, 2014   (JP) .................................. 2014-105666

(51) Int. Cl.
| | | |
|---|---|---|
| *B41J 2/47* | (2006.01) | |
| *G03G 15/043* | (2006.01) | |
| *H04N 1/113* | (2006.01) | |
| *G02B 26/12* | (2006.01) | |

(52) U.S. Cl.
CPC .............. *G03G 15/043* (2013.01); *B41J 2/47* (2013.01); *G02B 26/123* (2013.01); *H04N 1/113* (2013.01)

(58) Field of Classification Search
CPC ......... G03G 15/043; G03G 2215/0119; G03G 15/0152; G02B 26/123; H04N 1/113; H04N 1/506; B41J 2/47
See application file for complete search history.

(56) References Cited

U.S. PATENT DOCUMENTS

| 8,957,932 B2* | 2/2015 | Koga ................... G03G 15/043 347/130 |
| 2009/0016774 A1* | 1/2009 | Koga ................... G03G 15/043 399/221 |
| 2013/0162746 A1 | 6/2013 | Akagi ........................... 347/118 |
| 2013/0287418 A1* | 10/2013 | Akagi ................. G03G 15/043 399/51 |

(Continued)

FOREIGN PATENT DOCUMENTS

| JP | 2004-106419 | 4/2004 |
| JP | 2015-011237 | 1/2015 |
| WO | 2014/207799 | 12/2014 |

*Primary Examiner* — Matthew Luu
*Assistant Examiner* — Patrick King
(74) *Attorney, Agent, or Firm* — Fitzpatrick, Cella, Harper & Scinto

(57) ABSTRACT

A determination unit determines a bias current caused to flow through at least plurality of light-emitting portions regardless of image data during an image period by determining a first drive current for setting a light quantity of a light beam incident on a light reception unit during the non-image period to a first target light quantity, and determining a second drive current for setting a light quantity of a light beam incident on the light receiving unit to a second target light quantity that is different from the first target light quantity. The determination unit determines a drive current for performing switch-driving of the plurality of light-emitting portions, based on image data, the drive current corresponding to the first drive current and the bias current upon the image data being generated in a second section of a non-image period.

8 Claims, 17 Drawing Sheets

(56) References Cited

U.S. PATENT DOCUMENTS

| | | | |
|---|---|---|---|
| 2014/0368596 A1 | 12/2014 | Akagi | 347/118 |
| 2014/0375744 A1 | 12/2014 | Yamazaki | 347/118 |
| 2015/0002598 A1 | 1/2015 | Furuta | 347/133 |
| 2015/0062276 A1 | 3/2015 | Akagi | 347/118 |
| 2015/0331352 A1* | 11/2015 | Motoyama | G02B 26/121 347/118 |
| 2015/0338766 A1* | 11/2015 | Seki | B41J 2/47 347/118 |

* cited by examiner

F I G. 7A

|     | DIS | APCH | | APCM | | APCL | | ACC | | VDO | OFF |
| --- | --- | --- | --- | --- | --- | --- | --- | --- | --- | --- | --- |
| lsw | OFF | ON | OFF | ON | OFF | ON | OFF | ON | OFF | ON | OFF |
| lb  | OFF | ON | ON | ON | ON | ON | ON | ON | ON | ON | ON |
| ms3 | L | L | L | L | L | L | L | H | H | H | [1] |
| ms2 | L | L | L | L | L | H | H | L | L | H | [1] |
| ms1 | L | L | L | H | H | L | L | L | L | H | [1] |
| ms0 | L | H | H | L | L | L | L | H | H | H | [1] |
| ic  | [*] | L | H | L | H | L | H | L | H | [*] | [*] |
| ch3 | [*] | [2] | [*] | [2] | [*] | [2] | [*] | [2] | [*] | [*] | [*] |
| ch2 | [*] | [2] | [*] | [2] | [*] | [2] | [*] | [2] | [*] | [*] | [*] |
| ch1 | [*] | [2] | [*] | [2] | [*] | [2] | [*] | [2] | [*] | [*] | [*] |
| ch0 | [*] | [2] | [*] | [2] | [*] | [2] | [*] | [2] | [*] | [*] | [*] |

F I G. 7B

|     | e1 | e2 | e3 | e4 | e5 | e6 | e7 | e8 | e9 | e10 | e11 | e12 | e13 | e14 | e15 | e16 |
| --- | --- | --- | --- | --- | --- | --- | --- | --- | --- | --- | --- | --- | --- | --- | --- | --- |
| ch3 | L | L | L | L | L | L | L | L | H | H | H | H | H | H | H | H |
| ch2 | L | L | L | L | H | H | H | H | L | L | L | L | H | H | H | H |
| ch1 | L | L | H | H | L | L | H | H | L | L | H | H | L | L | H | H |
| ch0 | L | H | L | H | L | H | L | H | L | H | L | H | L | H | L | H |

| | DIS | APCH | | APCM | | APCL | | ACCH | | ACCM | | ACCL | | VDO | OFF |
|---|---|---|---|---|---|---|---|---|---|---|---|---|---|---|---|---|
| lsw | OFF | ON | OFF | ON | OFF | ON | OFF | ON | OFF | ON | OFF | ON | OFF | ON | OFF |
| PD | HI-Z | ON | ON | ON | OFF | ON | HI-Z | ON | OFF | ON | OFF | ON | OFF | ON | OFF |
| ms3 | L | L | L | L | L | L | HI-Z | H | L | H | H | H | H | H | HI-Z | [1] |
| ms2 | L | L | L | L | L | H | H | L | L | L | H | H | H | H | [1] |
| ms1 | L | L | L | H | H | L | L | L | L | H | L | L | L | [1] |
| ms0 | L | H | H | L | L | L | L | H | H | L | L | L | L | [1] |
| ic | [*] | L | H | L | H | L | H | L | H | L | H | L | H | [*] | [*] |
| ch3 | [*] | [2] | [*] | [2] | [*] | [2] | [*] | [2] | [*] | [2] | [*] | [2] | [*] | [3] | [*] |
| ch2 | [*] | [2] | [*] | [2] | [*] | [2] | [*] | [2] | [*] | [2] | [*] | [2] | [*] | [3] | [*] |
| ch1 | [*] | [2] | [*] | [2] | [*] | [2] | [*] | [2] | [*] | [2] | [*] | [2] | [*] | [3] | [*] |
| ch0 | [*] | [2] | [*] | [2] | [*] | [2] | [*] | [2] | [*] | [2] | [*] | [2] | [*] | [3] | [*] |

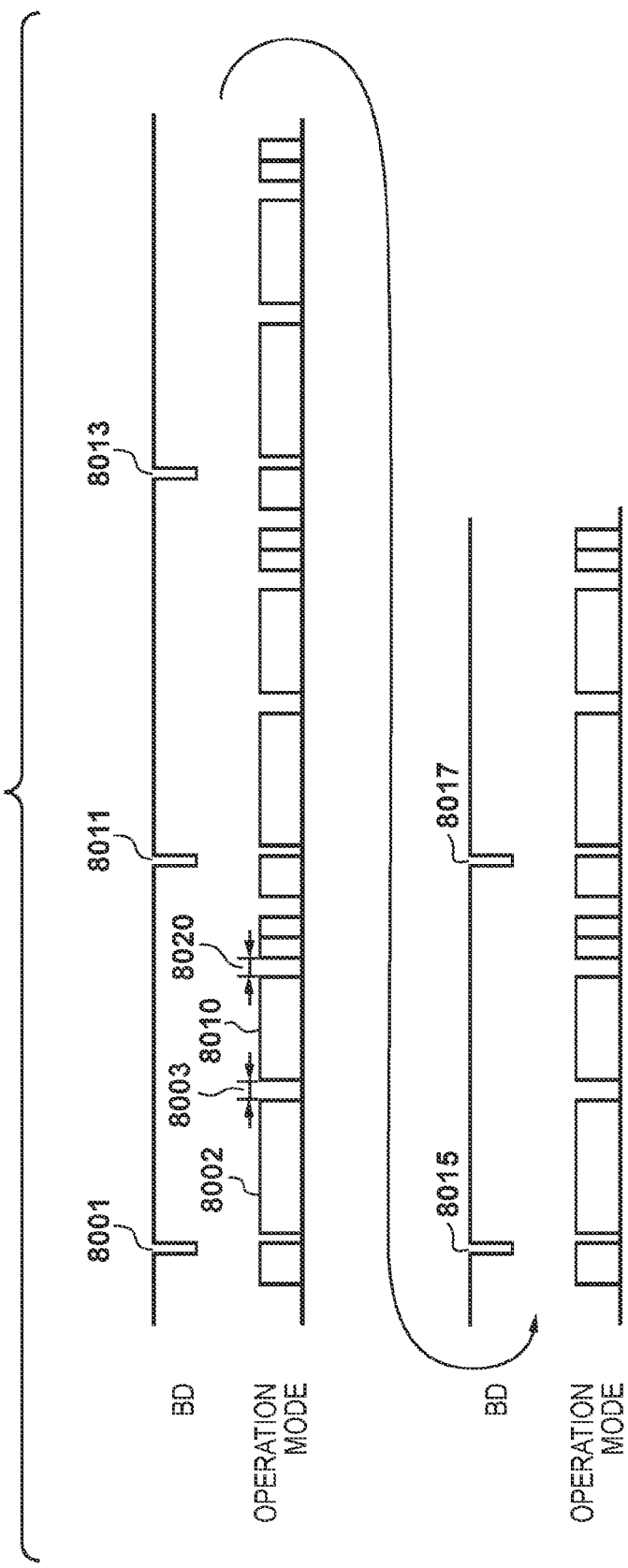

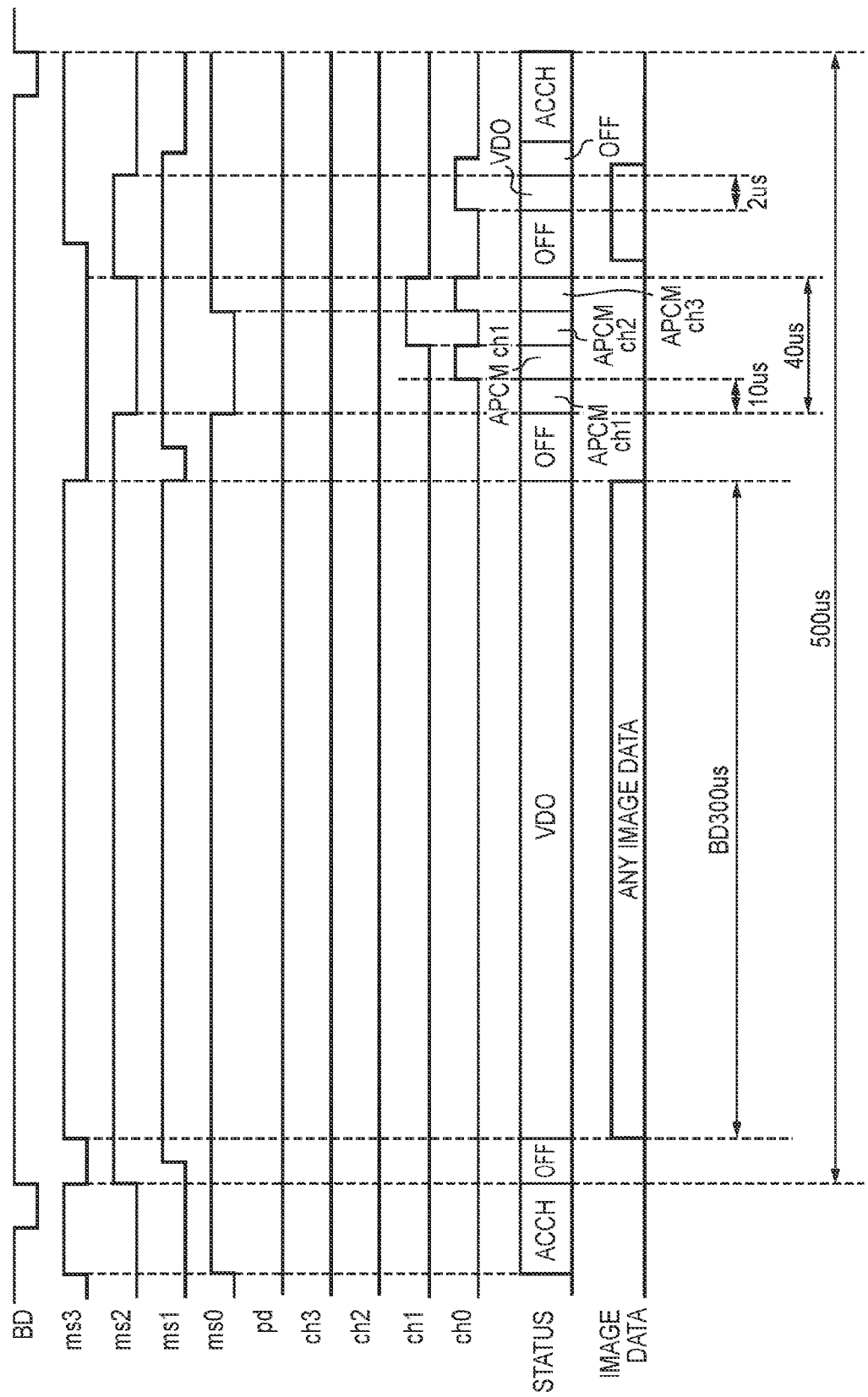

FIG. 17

|   | 1 | 2 | 3 | 4 |
|---|---|---|---|---|
| 1 | H1 | H2 | H3 | H4 |
| 2 | L1 | L2 | L3 | L4 |
| 3 | H5 | H6 | H7 | H8 |
| 4 | L5 | L6 | L7 | L8 |
| 5 | H9 | H10 | H11 | H12 |
| 6 | L9 | L10 | L11 | L12 |
| 7 | H13 | H14 | H15 | H16 |
| 8 | L13 | L14 | L15 | L16 |
| 9 | H17 | H18 | H19 | H20 |
| 10 | L17 | L18 | L19 | L20 |
| 11 | H21 | H22 | H23 | H24 |
| 12 | L21 | L22 | L23 | L24 |
| 13 | H25 | H26 | H27 | H28 |
| 14 | L25 | L26 | L27 | L28 |
| 15 | H29 | H30 | H31 | H32 |
| 16 | L29 | L30 | L31 | L32 |

IMAGE FORMING APPARATUS THAT FORMS IMAGE USING A PLURALITY OF LIGHT BEAMS

BACKGROUND OF THE INVENTION

Field of the Invention

The present invention relates to an image forming apparatus that forms an image using a plurality of light beams.

Description of the Related Art

In a laser scanning image forming apparatus, a plurality of main scanning lines are scanned, simultaneously using a plurality of light beams in order to raise the print speed. In addition, a high resolution is achieved by narrowing the interval of the light beams. One of the light sources that achieve this is a vertical cavity surface emitting laser (hereinafter, VCSEL). Automatic power control (APC) is employed in order to obtain a drive current with which a predetermined light quantity can be achieved with respect to the light beams. Conventionally, the APC is executed for all light-emitting portions during one scan cycle. However, as the number of light-emitting portions increases from 8 to 32, it has become difficult to execute the APC for all light-emitting portions during one scan cycle. Japanese Patent Laid-Open No. 2004-106419 proposes cyclic APC in which the light-emitting portion to be subjected to the APC is circulated by distributing the APC of a plurality of light-emitting portions to a plurality of scan cycles.

Incidentally, a standby current (which may be called bias current Ib) is caused to flow through each light-emitting portion, the standby current being for causing light-emitting portions to emit light to the extent to which a photosensitive member is not exposed, in order to improve the responsiveness of the light-emitting portions. The value of the bias current Ib is calculated based on the value of a threshold current Ith. Since this threshold current Ith varies depending on environmental conditions or the like, an appropriate value thereof needs to be found. The threshold current Ith is determined using a linear relationship (I-L characteristic) between the drive current and the light quantity, the linear relationship being obtained by measuring light quantities Pl and Pm at the time of causing a current Il and a current Im to flow through a light-emitting portion, respectively. Furthermore, a switching current Isw that is caused to flow when scanning the photosensitive member also needs to be determined for each light-emitting portion before scanning the photosensitive member. The switching current Isw is calculated by obtaining a current Ih with which a predetermined light quantity Ph is obtained and subtracting the threshold current Ith from the current Ih. Thus, three light quantities, namely the light quantities Pl, Pm, and Ph are useful in light quantity control, and the APC is executed such that the light quantities of laser beams which are incident on a light-receiving element are the three light quantities Pl, Pm, and Ph. The above APC will be called APCL, APCM, and APCH, respectively.

Since three types of APC are thus necessary, if, for example, 32 light-emitting portions exist, the APC needs to be performed 96 times. Applying the cyclic APC, for example, the APCL is executed in the first scan cycle, the APCM is executed in the second scan cycle, and the APCH is executed in the third scan cycle. Note that one scan cycle includes a period (image period) in which scanning light scans the photosensitive member and a period (non-image period) in which the scanning light scans portions other than the photosensitive member, and the APC is executed during the non-image period. For this reason, the APCH is performed during the non-image period and thereafter the image period (data mode) begins in one scan cycle, and the APCM or the APCL is executed and thereafter the image period begins in another scan cycle.

As mentioned above, Ith is calculated in the APCM and the APCL and thereafter Ih is detected in the APCH, and Isw is thereby calculated from Ih and Ib that is calculated based on Ith. For this reason, if the image period begins immediately after executing the APCM or the APCL, Ih cannot be detected since the APCH has not been performed. In this case, Isw is not fixed until image data is input, and therefore Isw is fixed by referencing Ih that has been detected at the previous time. That is to say, since the calculation of Isw is started after image data is input, transient response of the drive current occurs in accordance with the calculation time of Isw, and the waveform of the laser beams is blunted.

In an image forming apparatus, the sensitivity of the photosensitive member or the like changes dues to the environmental temperature or the like, and accordingly the density varies. In this regard, in order to maintain a fixed density by controlling the light quantity of the laser, a method for correcting the switching current Isw by multiplying it by a correction coefficient $\alpha$ is conceivable. However, the timing of multiplying the switching current Isw by this correction coefficient $\alpha$ is when image data is input in one scan cycle. This is because the switching current Isw can be accurately corrected by performing the calculation using a possible latest correction coefficient $\alpha$. For this reason, immediately after starting image formation, transient response of the drive current occurs in accordance with the calculation time taken for calculating Isw×$\alpha$, and the waveform of the laser beams is blunted.

SUMMARY OF THE INVENTION

The present invention reduces a delay in the rising of the light quantity at the beginning of an image period by stabilizing the value of the switching current for driving light-emitting portions at an early stage.

The present invention provides an image forming apparatus comprising the following element. A light source including a plurality of light-emitting portions each of which outputs a light beam for exposing a photosensitive member. A light reception unit is configured to receive a light beam individually output by the plurality of light-emitting portions, and output a detection signal corresponding to a light quantity of the received light beam. A deflection unit is configured to deflect the light beam so as to scan on the photosensitive member. A drive unit is configured to perform switch-driving of the plurality of light-emitting portions by supplying a drive current to each of the plurality of light-emitting portions in accordance with image data in an image period in which the light beam deflected by the deflection unit scans on the photosensitive member in order to form an image on the photosensitive member, and supply a drive current for controlling a light quantity of the plurality of light-emitting portions in a first section of a non-image period in which the light beam deflected by the deflection unit does not scan on the photosensitive member, the image period and the non-image period constituting a scan cycle. A determination unit is configured to determine a value of the drive current for performing switch-driving of the plurality of light-emitting portions, based on the detection signal output by the light reception unit with respect to the light beam that is individually output by the plurality of light-emitting portions during the non-image period. A generation unit is configured to generate image data in a second section of the non-image period. The determination unit is further configured to determine a value of a bias current caused to flow through at least the plurality of light-emitting portions regardless of image data during the image period by determining a value of a first drive current for setting a light quantity of a light beam incident on the light reception unit during the non-image period to a first target light quantity, and determining a value of a second drive current for setting a light quantity of the light beam incident on the light receiving unit to a second target light quantity that is different from the first target light quantity, and the determination unit further determines the value of the drive current for performing switch-driving of the plurality of light-emitting portions, based on the image data, the drive current corresponding to the first drive current and the bias current, upon the image data being generated by the generation unit in the second section of the non-image period.

Further features of the present invention will become apparent from the following description of exemplary embodiments with reference to the attached drawings.

BRIEF DESCRIPTION OF THE DRAWINGS

FIGS. 7A and 7B are diagrams showing an example of a mode select signal and the like.

FIGS. 9A to 9D are diagrams illustrating lighting order in cyclic APC.

FIG. 10 is a diagram showing an example of the mode select signal and the like.

FIG. 11 is a diagram illustrating a plurality of scan cycles.

FIG. 12 is a diagram illustrating an exemplary operation mode in one scan cycle.

FIG. 17 is a diagram illustrating lighting order in cyclic APC.

DESCRIPTION OF THE EMBODIMENTS

Hereinafter, modes for carrying out the present invention will be described using the drawings. Note that the following embodiment is not intended to limit the invention according to the claims, and not all combinations of features described in the embodiment are always necessary.

Image Forming Apparatus

Figure 1:
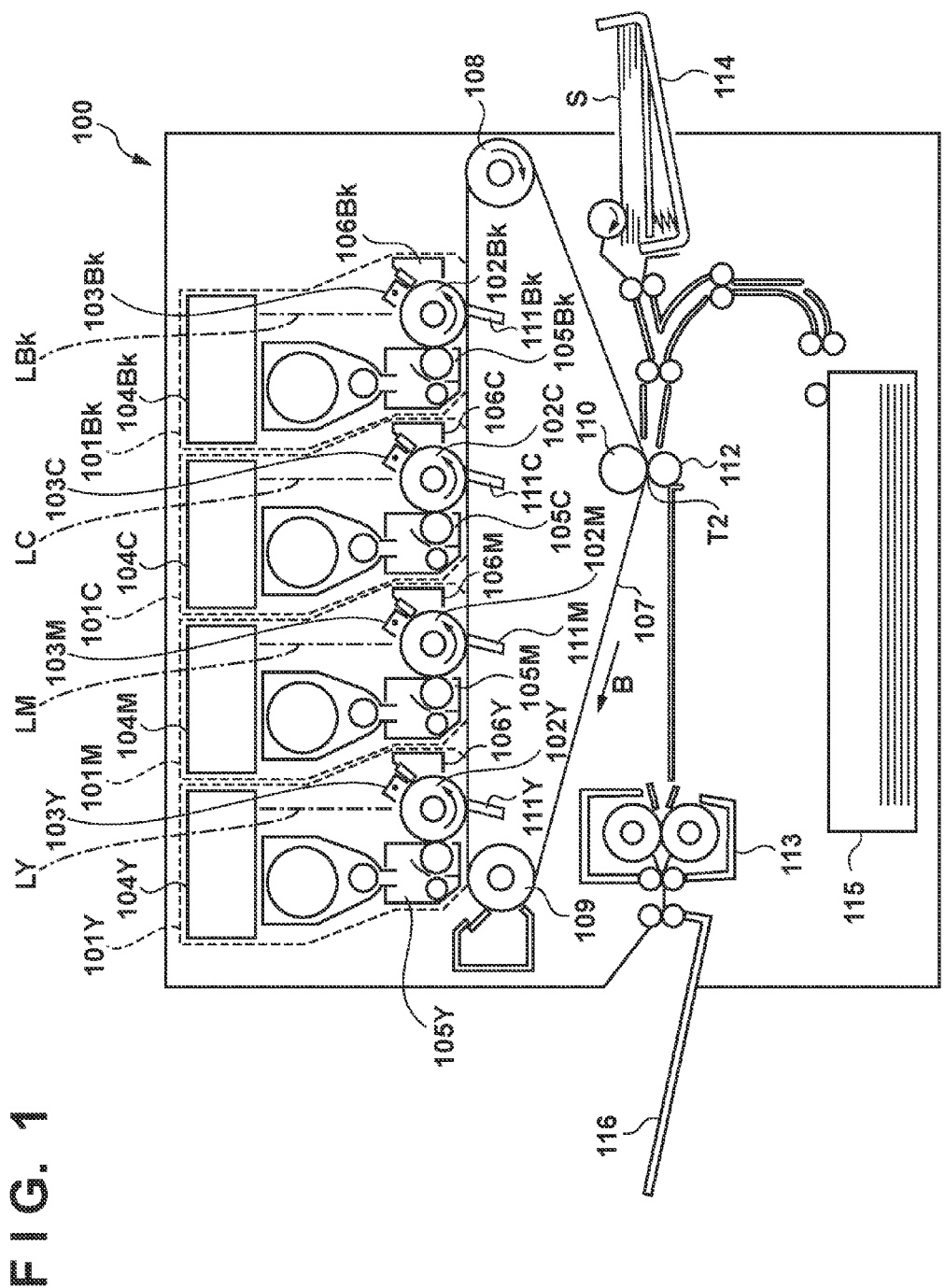
FIG. 1 is a diagram schematically showing an exemplary image forming apparatus.

An embodiment will be described below, taking an electrophotographic color image forming apparatus as an example. FIG. 1 is a schematic cross-sectional view of the color image forming apparatus. An image forming apparatus 100 shown in FIG. 1 is a full-color printer that forms an image using toner of a plurality of colors. Note that, although the following description will take a full-color printer as an example of the image forming apparatus, other kinds of image forming apparatus may also be employed, such as a monochrome printer that forms an image using toner of a single color (e.g., black) or a color or monochrome copying machine having a reader device.

In FIG. 1, the image forming apparatus 100 has image forming units 101Y, 101M, 101C, and 101Bk, each of which forms an image of the corresponding color. The image forming units 101Y, 101M, 101C, and 101Bk form images using toner of yellow (Y), magenta (M), cyan (C), and black (Bk), respectively. The image forming units 101Y, 101M, 101C, and 101Bk respectively include photosensitive drums 102Y, 102M, 102C, and 102Bk, which are photosensitive members. Charging devices 103Y, 103M, 103C, and 103Bk, optical scanning devices 104Y, 104M, 104C, and 104Bk, and developing devices 105Y, 105M, 105C, and 105Bk are arranged around the photosensitive drums 102Y, 102M, 102C, and 102Bk, respectively. Furthermore, drum cleaning devices 106Y, 106M, 106C, and 106Bk are arranged around the photosensitive drums 102Y, 102M, 102C, and 102Bk, respectively. An endless intermediate transfer belt 107 (intermediate transfer member) is arranged below the photosensitive drums 102Y, 102M, 102C, and 102Bk. The intermediate transfer belt 107 is extended by a drive roller 108 and follower rollers 109 and 110, and is driven to rotate in a direction of arrow B shown in FIG. 1 during image formation. Primary transfer devices 111Y, 111M, 111C, and 111Bk are arranged at respective positions facing the photosensitive drums 102Y, 102M, 102C, and 102Bk via the intermediate transfer belt 107. The image forming apparatus 100 also includes a secondary transfer device 112 for transferring a toner image on the intermediate transfer belt 107 onto a recording medium S, and a fixing device 113 for fixing a toner image on the recording medium S.

Subsequently, an image forming process in the image forming apparatus 100 will be described. Since the same image forming process is used in the image forming units 101Y, 101M, 101C, and 101Bk, the image forming unit 101Y will be taken as an example in this description, and a description of the image forming process in the image forming units 101M, 101C, and 101Bk will be omitted. Initially, a surface of the photosensitive drum 102Y, which is driven to rotate in the rotation direction indicated by an arrow in FIG. 1, is uniformly charged by the charging device 103Y. The charged photosensitive drum 102Y is exposed to a laser beam LY (light beam) emitted from the optical scanning device 104Y. An electrostatic latent image is thereby formed on the photosensitive drum 102Y. Thereafter, this electrostatic latent image is developed by the developing device 105Y, and a yellow toner image is formed on the photosensitive drum 102Y. The primary transfer devices 111Y, 111M, 111C, and 111Bk apply transfer bias to the intermediate transfer belt 107. Yellow, magenta, cyan, and black toner images on the photosensitive drums 102Y, 102M, 102C, and 102Bk are thereby transferred onto the intermediate transfer belt 107. As a result, a multi-color (color) toner image is formed on the intermediate transfer belt 107. The color toner image on the intermediate transfer belt 107 is transferred onto a recording medium S that has been conveyed from a manual feed cassette 114 or a feed cassette 115 to the secondary transfer unit T2 by the secondary transfer device 112. The color toner image on the recording medium S is heated and fixed by the fixing device 113, and the recording medium S is thereafter discharged to a discharge unit 116. Note that residue toner that remains on the photosensitive drums 102Y, 102M, 102C, and 102Bk without being transferred onto the intermediate transfer belt 107 is removed by the drum cleaning devices 106Y, 106M, 106C, and 106Bk. Thereafter, the above image forming process is executed again.

Optical Scanning Device

Figure 2:
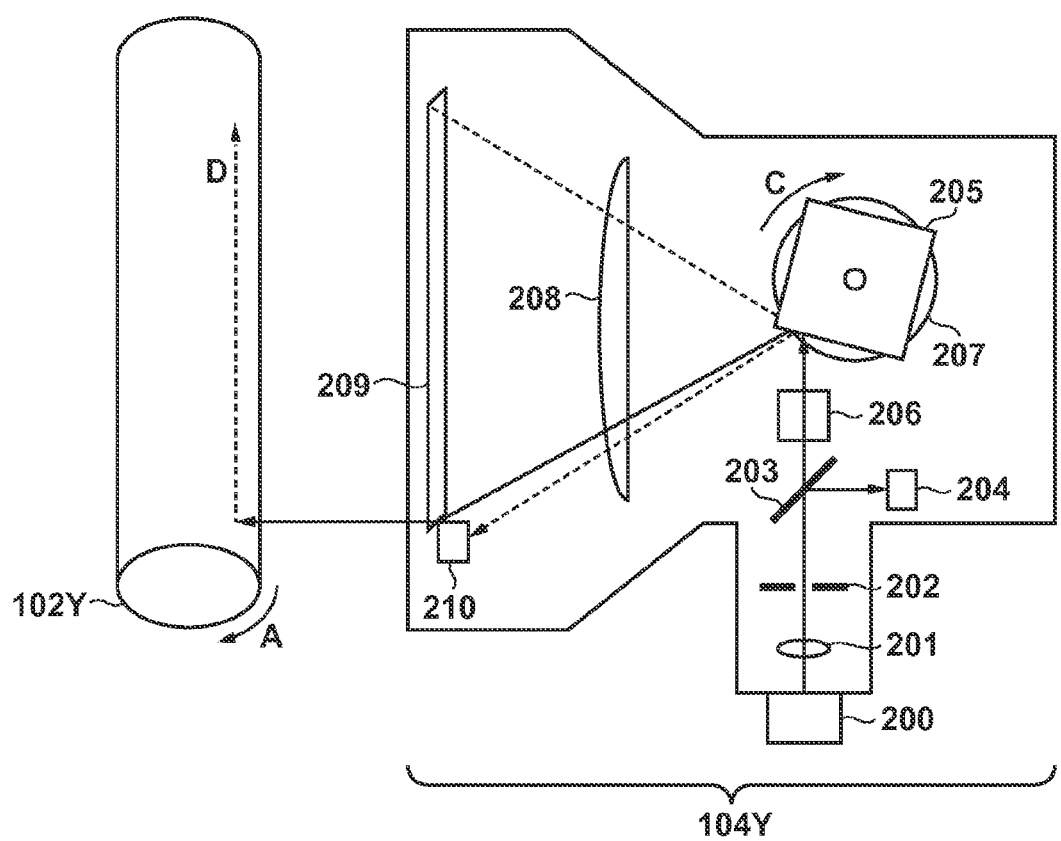
FIG. 2 is a diagram showing an exemplary optical scanning device.

FIG. 2 is a schematic configuration diagram of the optical scanning devices 104Y, 104M, 104C, and 104Bk. Since the optical scanning devices have the same configuration, FIG. 2 (and later-described FIG. 3) shows the optical scanning device 104Y as an example. In FIG. 2, a semiconductor laser 200 is an example of a light source having a plurality of light-emitting portions that output light beams for exposing the photosensitive member. A laser beam, which is divergent light emitted from the semiconductor laser 200, is formed into substantially parallel light by a collimator lens 201, and passage of the laser beam is restricted by a diaphragm 202. The laser beam is thereby formed. The laser beam that has passed through the diaphragm 202 is incident on a beam splitter 203. The beam splitter 203 separates the laser beam that has passed through the diaphragm 202 into a laser beam that is incident on a photosensor 204 and a laser beam that is incident on a rotary polygon mirror 205, which is an example of a deflection unit. The photosensor 204 is an example of a light-receiving unit. Specifically, the photosensor 204 receives laser beams individually emitted from the light-emitting portions in time series, thereby outputting a detection signal having a value (voltage) corresponding to the light quantity of each laser beam received as a light reception result. A laser beam that has passed through the beam splitter 203 passes through a cylindrical lens 206 and is incident on the rotary polygon mirror 205. The rotary polygon mirror 205 includes a plurality of (in the present embodiment, four) reflecting surfaces. The rotary polygon mirror 205 rotates in the direction of arrow C as a result of being driven by a motor 207. The rotary polygon mirror 205 deflects each laser beam such that the laser beam scans the photosensitive drum 102Y in the direction of arrow D. The laser beam deflected by the rotary polygon mirror 205 is transmitted through an image forming optical system (fθ lens) 208 having an fθ characteristic, and is guided onto the photosensitive drum 102Y (i.e., onto a photosensitive member) via a mirror 209. Thus, the rotary polygon mirror 205 deflects a plurality of laser beams emitted from a plurality of light-emitting portions 301 to 332 such that the laser beams scan the photosensitive drum 102Y. The optical scanning device 104Y includes a beam sensor 210. The beam sensor 210 is arranged at a position on a scanning path of the laser beams, the position being out of an image forming area on the photosensitive drum 102Y. The beam sensor 210 generates and outputs, as a (horizontal) synchronizing signal, a detection signal (BD signal) indicating detection of a laser beam, in accordance with reception of the laser beam deflected by the rotary polygon mirror 205.

Laser Light Source

Figure 3A:
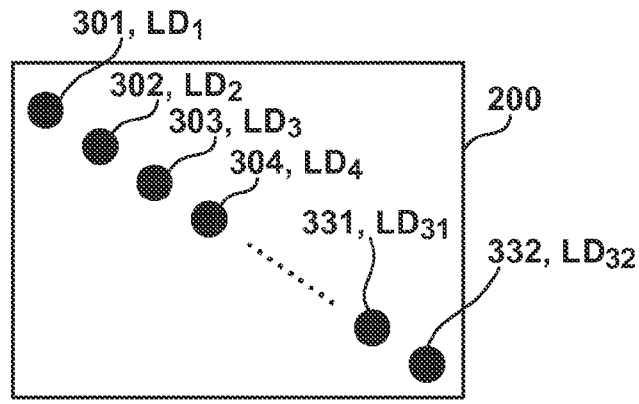
FIGS. 3A to 3C are diagrams showing a relationship between light-emitting portions and scan lines.
Figure 3B:
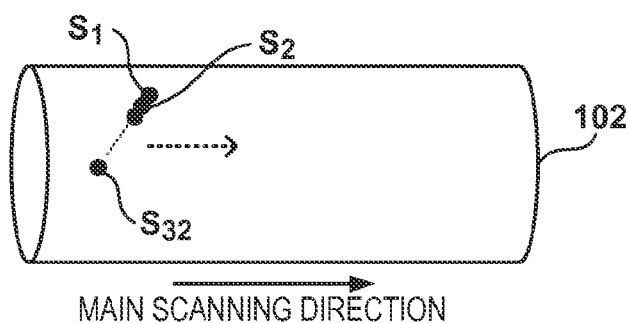
Figure 3C:
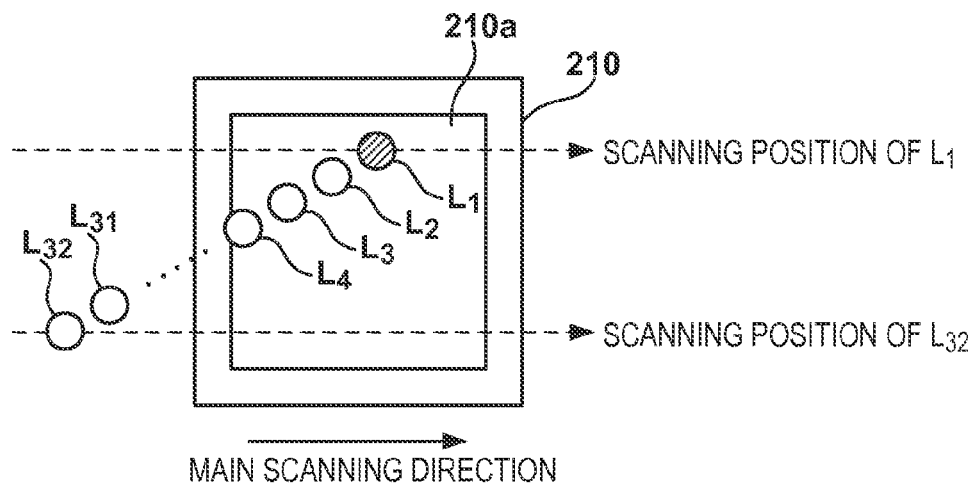

Next, light sources (laser light sources) provided in the optical scanning devices 104Y, 104M, 104C, and 104Bk will be described. FIG. 3A shows a plurality of light-emitting portions provided in the semiconductor laser 200 shown in FIG. 2, and FIG. 3B is a diagram showing an arrangement image of laser spots on the photosensitive drum 102Y when laser beams are simultaneously emitted from the plurality of light-emitting portions. As shown in FIG. 3A, the semiconductor laser 200 in the present embodiment is a vertical cavity surface emitting laser (VCSEL) having 32 light-emitting portions 301 to 332. Note that the semiconductor laser is not limited to a VCSEL, and may also be a semiconductor laser of an end face light-emitting type. The light-emitting portions 301 to 332 are arranged in an array form on a substrate. Since the light-emitting portions are arranged as shown in FIG. 3A, if the light-emitting portions are simultaneously caused to turn on the light, laser beams L1 to L32 emitted from the light-emitting portions cause different positions on the photosensitive drum 102Y in a main scanning direction to be exposed, as indicated as image forming positions S1 to S32 in FIG. 3B. If the light-emitting portions are simultaneously caused to turn on the light, the laser beams L1 to L32 emitted from the light-emitting portions cause different positions in a sub-scanning direction to be exposed, as indicated as the image forming positions S1 to S32 in FIG. 3B. Note that, although FIG. 3A shows an example of the plurality of light-emitting portions arranged in a line (one-dimensional arrangement), the arrangement of the light-emitting portions may be two-dimensional arrangement. FIG. 3C is a diagram showing a schematic configuration of the beam sensor 210 arranged at a position on the scanning path of the laser beams, and scanning positions on the beam sensor 210 of the laser beams L1 to L32 emitted from the light-emitting portions 301 to 332 (LD1 to LD32) of the semiconductor laser 200. The beam sensor 210 includes a light-receiving surface 210a in which photoelectric conversion elements are flatly arranged. Upon each laser beam being incident on the light-receiving surface 210a, the beam sensor 210 generates and outputs a detection signal (BD signal) indicating detection of the laser beam. In FIG. 3C, only a light-emitting portion 301 (LD1) among the light-emitting portions 301 to 332 is caused to turn on the light, and a state where a laser beam L1 emitted from this light-emitting portion is incident on the light-receiving surface 210a is shown as an example. In later-described BD interval measurement, laser beams L1 and L32 emitted respectively from light-emitting portions 301 and 332 (LD1 and LD32) are caused to be sequentially incident on the beam sensor 210, thereby causing two BD signals corresponding to the respective laser beams to be sequentially output from the beam sensor 210.

Control System of Image Forming Apparatus

Figure 4:
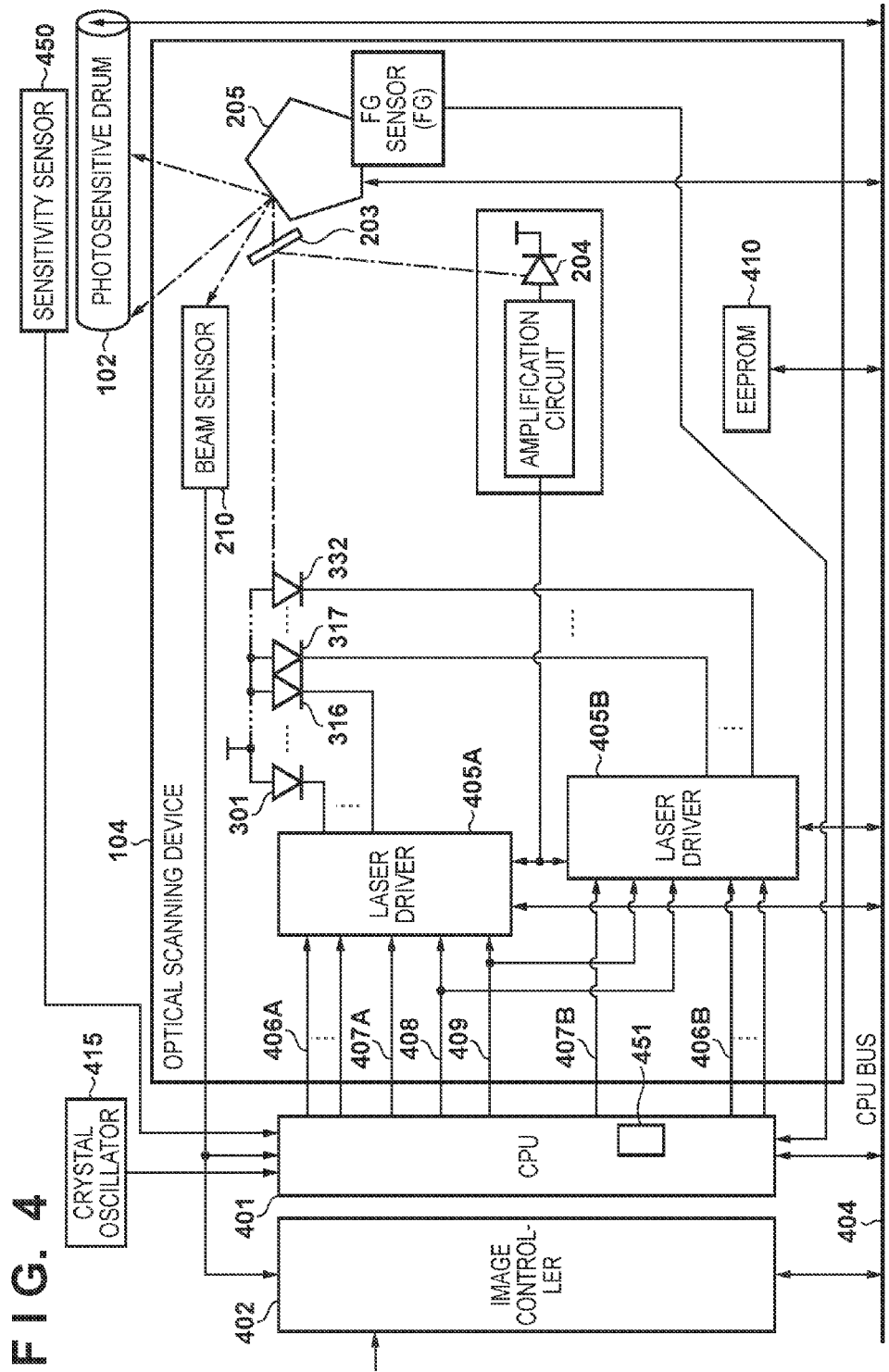
FIG. 4 is a diagram showing an exemplary control unit.
Figure 6:
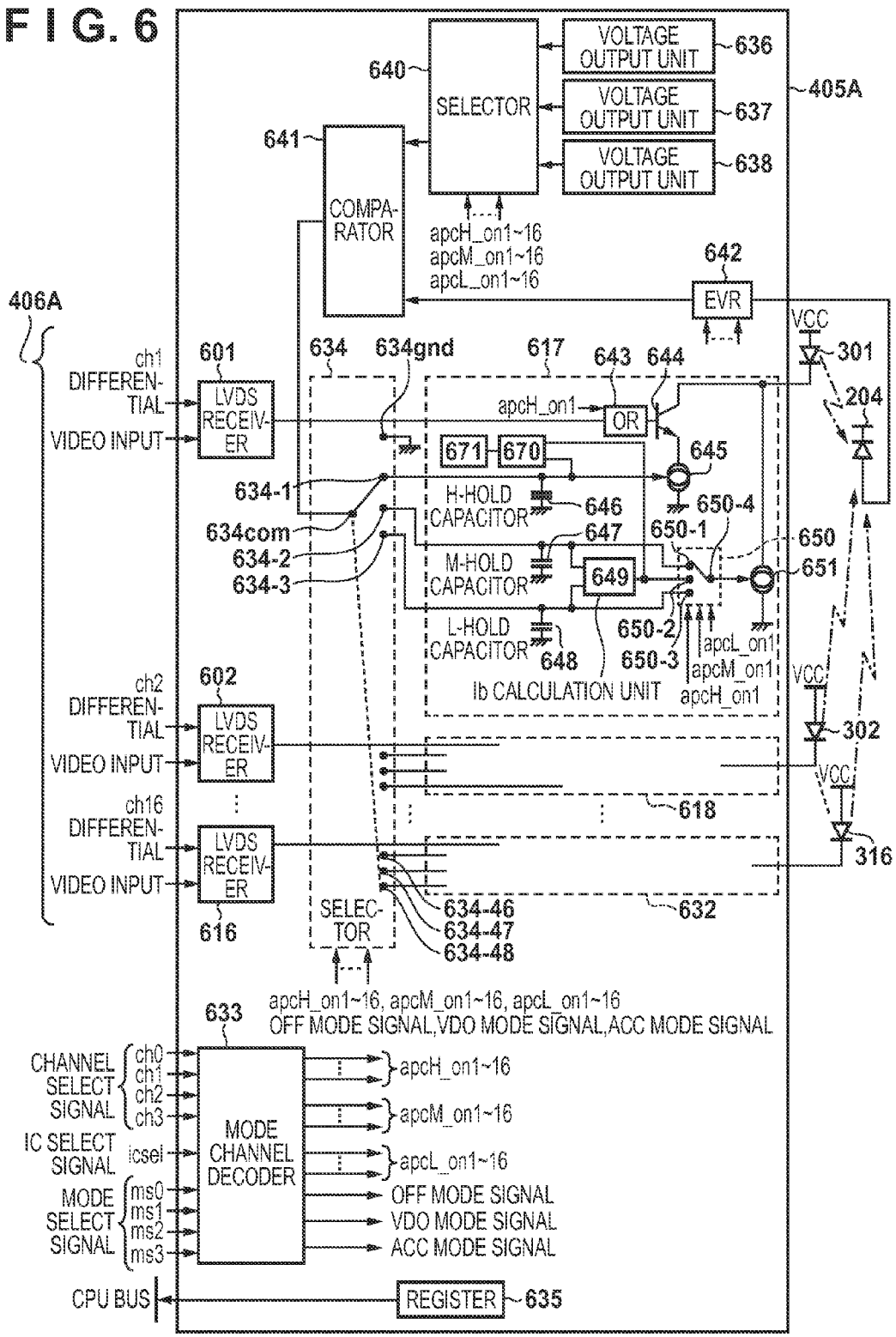
FIG. 6 is a diagram showing an exemplary laser driver.

FIG. 4 is a control block diagram for illustrating an exemplary control system used in the image forming apparatus 100 shown in FIG. 1. Note that, since the optical scanning device 104Y, 104M, 104C, and 104Bk have the same configuration, the suffixes Y, M, C, and Bk will be omitted in the following description. Note that FIG. 4 and later-described FIG. 6 show a configuration relating to 32 beams with part of the configuration omitted, since the configuration is repeated in a line.

The image forming apparatus includes a CPU 401, an image controller 402, the optical scanning devices 104, the photosensitive drums 102, a crystal oscillator 415, a CPU bus 404, and an EEPROM 410. The CPU 401 and the image controller 402 are included in an image forming apparatus body, and both of them are connected to each optical scanning device 104. The optical scanning devices 104 each have first and second laser drivers (laser driver ICs) 405A and 405B. Note that, for the sake of simplification of the description, FIG. 4 shows first and second laser drivers 405A and 405B and light-emitting portions 301 to 332 (light-emitting elements) corresponding to one of Y, M, C, and Bk. In practice, the first and second laser drivers 405A and 405B and the light-emitting portions 301 to 332 are provided for each of Y, M, C, and Bk. The CPU 401 controls the overall image forming apparatus including the optical scanning devices 104. The CPU 401 receives supply of a 100-MHz reference clock from the crystal oscillator 415. The CPU 401 generates a 1 GHz-clock, which is an image clock of a laser scanning system by multiplying the reference clock by 10 using an embedded PLL circuit. The image controller 402 separates image data received from an external device connected to the image forming apparatus 100 or a reader device attached to the image forming apparatus, into color components of four colors, namely Y, M, C, and Bk. The image controller 402 outputs image data of the color components of four colors, namely Y, M, C, and Bk, to the CPU 401 via the CPU bus 404, synchronously with the reference clock. The CPU 401 stores the image data received from the image controller 402 in a memory (not shown), and converts the image data stored in the memory into a differential signal (LVDS: Low Differential Voltage Signal) based on the image clock. The CPU 401 outputs the differential signal to the laser drivers 405A and 405B at a timing based on the BD signal and an image clock signal.

The laser drivers 405A and 405B are an example of drive units that performs switch-driving of the plurality of light-emitting portions by supplying a drive current to each of the light-emitting portions in accordance with the image data during an image period, and supplying a drive current for controlling the light quantity of the light-emitting portions in a first section of a non-image period. Note that the image period is a period during which the light beam deflected by the rotary polygon mirror 205 scans on the photosensitive member in order to form an image on the photosensitive member. The non-image period is a period during which the light beam deflected by the rotary polygon mirror 205 does not scan on the photosensitive member. The laser drivers 405A and 405B generate PWM signals based on the differential signal input from the CPU 401, and emit laser beams for forming an electrostatic latent image from the light-emitting portions 301 to 332, based on the PWM signals. The laser drivers 405A and 405B also control the light quantity of the laser beams for forming the electrostatic latent image, the value of a bias current Ib corresponding to a standby current, and the value of a switching current Isw by performing automatic power control (APC), which includes later-described APCM, APCL, and APCH. The bias current Ib is a drive current that causes the light-emitting portions to emit light beams having a light quantity with which the photosensitive member is not exposed, and is calculated by multiplying a threshold current Ith by a correction coefficient.

The laser drivers 405A and 405B shown in FIG. 4 are ICs having the same parts model number, and each can control 16 light-emitting portions. In the present embodiment, the laser driver 405A controls light-emitting portions 301 to 316, and the laser driver 405B controls light-emitting portions 317 to 332. A 5V DC line and a ground line are supplied to the two laser drivers 405A and 405B from a body back substrate (not shown). That is to say, the power is supplied to the two laser drivers 405A and 405B and the light-emitting portions 301 to 332 from a common power source.

The CPU 401 and the laser drivers 405A and 405B are connected to each other by a plurality of following signal lines. A signal line 406A is a signal line group for transmitting a differential signal for driving the light-emitting portions 301 to 316 from the CPU 401 to the laser driver 405A. A signal line 406B is a signal line group for transmitting a differential signal for driving the light-emitting portions 317 to 332 from the CPU 401 to the laser driver 405B. The signal line 407A is a signal line that connects the CPU 401 to the laser driver 405A, and the signal line 407B is a signal line that connects the CPU 401 to the laser driver 405B. The CPU 401 transmits an IC select signal icsel_0 to the laser driver 405A via the signal line 407A, and transmits an IC select signal icsel_1 to the laser driver 405B via the signal line 407B. When the IC select signal icsel_0 is at an H (high) level, the IC select signal icsel_1 is at an L (low) level, and when the IC select signal icsel_0 is at the L level, the IC select signal icsel_1 is at the H level. In the image forming apparatus 100 in the present embodiment, a laser driver to which the IC select signal at the L level is input executes the APC for a control target light-emitting portion. The signal lines 408 and 409 are signal lines that connect the CPU 401 to the laser drivers 405A and 405B. The signal lines 407A, 407B, 408, and 409 are interfaces for transmitting an operation mode (control mode) signal for setting a later-described operation mode of the laser drivers 405A and 405B. The laser drivers 405A and 405B execute various kinds of control based on the operation mode signal transmitted from the CPU 401. The EEPROM 410 stores information regarding a later-descried APC sequence. The CPU 401 executes control of the light quantity at each light-emitting portion in the order based on the information regarding the APC sequence stored in the EEPROM 410.

The CPU 401 may detect the sensitivity of the photosensitive drum using a sensitivity sensor 450 before image formation, and set the correction coefficient α corresponding to the sensitivity in a register 635. The CPU 401 may measure elapsed time from the input of the BD signal using a timer 451, and control the timing of executing various kinds of processing in accordance with the measurement value.

Operation Mode

DIS Mode (Disable Mode)

A DIS mode is set in an initial state immediately after the power of the image forming apparatus 100 is turned on. The DIS mode is set for interlocking (stopping energization) in a state where a door for maintenance is open, for the purpose of maintenance of the image forming apparatus. The DIS mode is a state where the charge of later-described hold capacitors is discharged, and laser beams are not emitted from the light-emitting portions.

OFF Mode

An OFF mode is a mode set in a period (non-image period) other than a period (image period) during which the laser beams forming an image scan an image forming area on the photosensitive drums, and in a state where the laser drivers 405A and 405B are waiting for input of the LVDS. The OFF mode is a mode in which the bias current Ib is supplied to the light-emitting portions but the switching current Isw is not supplied thereto.

ACC (Automatic Current Control) Mode

An ACC mode is a mode in which the light-emitting portions are forced to turn on the light. The ACC mode in the image forming apparatus 100 in the present embodiment is a mode in which the light-emitting portions are forced to turn on the light using a current whose value is obtained by multiplying the drive currents Il, Im, and Ih determined in the APC mode by a correction coefficient αn.

VDO Mode

A VDO mode (VIDEO mode) is a mode that is set during the image period. The VDO mode is a mode in which the bias current Ib is supplied to the light-emitting portions, and the switching current Isw is subjected to on-off control based on a PWM signal generated from the LVDS that is input to the laser drivers 405A and 405B. However, in the present embodiment, the operation mode transitions to the VDO mode for a short time period also during the image period, in order to determine the switching current Isw corrected using a latest correction coefficient α.

APC Mode

An APC mode is a mode in which the APC is executed. The value of the bias current Ib is controlled based on results of the later-described APCM and the APCL, and the value of the switching current Isw is controlled based on a result of the later-described APCH. The APC mode is a mode that is set during the non-image period in order to execute the APCM, the APCL, and the APCH during a period other than the period of the OFF mode.

APC

Figure 5:
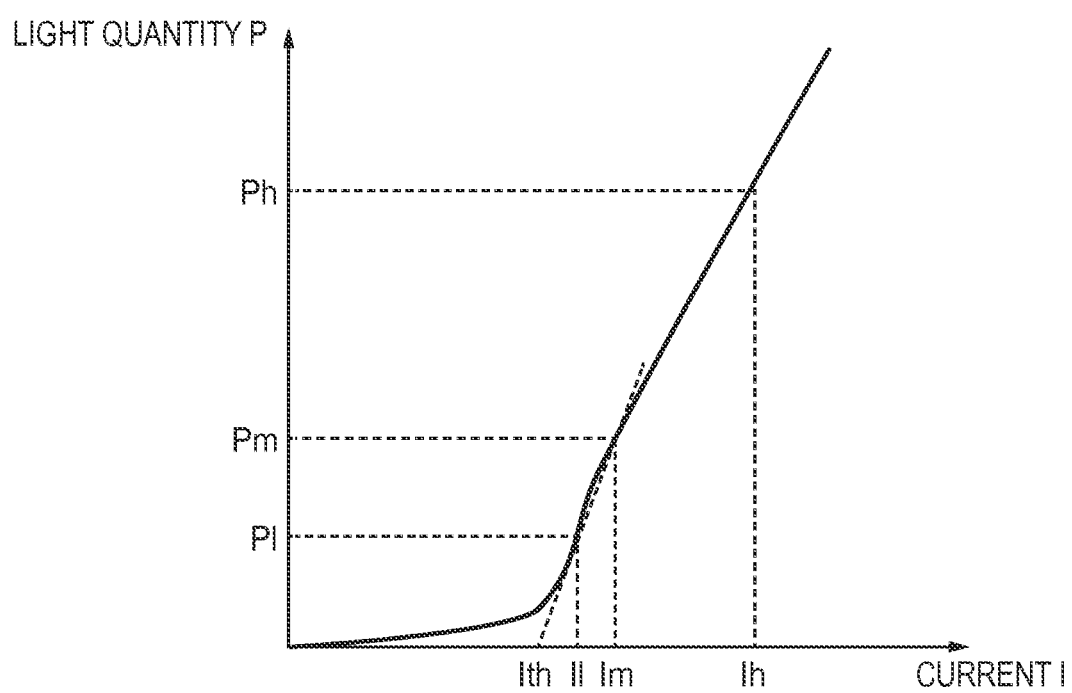
FIG. 5 is a diagram showing a relationship between a drive current and a light quantity.

Next, the APC executed in the image forming apparatus 100 in the present embodiment will be described in detail. First, the bias current Ib and the switching current Isw will be described. FIG. 5 is a diagram showing a light emission characteristic of a certain light-emitting portion in the semiconductor laser 200, with the horizontal axis indicating the value of a current supplied to the light-emitting portion and the vertical axis indicating the light quantity of a laser beam emitted from a light-emitting portion. The curve shown in FIG. 5 indicates the light emission characteristic representing a relationship between the value of the current supplied to each light-emitting portion and the light quantity of the laser beam. Note that this light emission characteristic is a characteristic unique to each light-emitting portion, changes depending on the temperature of the light-emitting portion, and also changes with time. For this reason, in order to suppress an occurrence of a variation in image density with a change of the light emission characteristic, an electrophotographic image forming apparatus needs to execute the APC for each light-emitting portion at high frequency.

As shown in FIG. 5, in general, a semiconductor laser has a characteristic that the increase in the light quantity of a laser beam with respect to the increase in the current value is gentle in an area in which the value of the current supplied to a light-emitting portion is lower than the threshold current Ith, whereas the amount of increase in the light quantity of the laser beam with respect to the increase in the current value increases in an area in which the value of the current supplied to the light-emitting portion is higher than the threshold current Ith. Upon a current smaller than or equal to the threshold current Ith being supplied, the semiconductor laser naturally emits light without an induced oscillation. Since the light quantity obtained from the natural light emission is weak, the potential of the photosensitive drum does not change even if the natural light emission occurs.

Using this characteristic of the semiconductor laser, the electrophotographic image forming apparatus supplies the bias current Ib having a value close to the threshold current Ith to each light-emitting portion in order to suppress a decrease in the light emission responsiveness. The switching current Isw is supplied based on the PWM signal generated from the LVDS in a state where the bias current Ib is supplied, thereby causing a laser beam having an intensity with which the potential of the photosensitive drum surface can be changed to be emitted from the light-emitting portion. As a result of causing the light-emitting portion to turn on the light in a state where the bias current Ib is supplied thereto, the time taken to reach a target light quantity of the laser beam can be shortened as compared with the case of causing the light-emitting portion to turn on the light in a state where the bias current Ib is not supplied thereto.

Next, control of the value of the bias current Ib in the image forming apparatus 100 in the present embodiment will be described. The laser drivers 405A and 405B execute the APCM and the APCL at different timings with respect to the light-emitting portions 301 to 332. Here, the APCM and the APCL will be described using the laser driver 405A and the light-emitting portion 301.

As mentioned above, the laser driver 405A executes the APCM for controlling the value of the current to be supplied to the light-emitting portion 301 such that the light quantity of the beam light received by the photosensor 204 is Pm. The laser driver 405A holds a current value Im corresponding to the light quantity Pm as a control result of the APCM. The laser driver 405A also executes the APCL for controlling the value of the current supplied to the light-emitting portion 301 such that the light quantity received by the photosensor 204 is Pl (Pl=Pm/2). The laser driver 405A holds a current value Il corresponding to the light quantity Pl as a control result of the APCL. Note that, when the laser driver 405A executes the APCM and the APCL with respect to the light-emitting portion 301, the laser driver 405A supplies, to the light-emitting portions 302 to 316, only the bias current Ib having a value corresponding to the respective light-emitting portions (OFF mode). The laser driver 405B also similarly supplies, to the light-emitting portions 317 to 332, only the bias current Ib corresponding to the respective light-emitting portions (OFF mode).

The laser driver 405A obtains, by calculation, an intersection point of a line (correspondence relationship) connecting the coordinates (Im, Pm) and the coordinates (Il, Pl) and the axis on which the light quantity is "0" in FIG. 5, and sets the value of this intersection point as the threshold current Ith. Then, the laser driver 405A updates (resets) the value of the bias current Ib by multiplying the threshold current Ith by a predetermined coefficient. Note that the coefficient is set in advance based on the sensitivity of the photosensitive drums attached to the image forming apparatus, and may be a value larger than or equal to 1, or may be a value smaller than 1.

Next, control of the value of the switching current Isw in the image forming apparatus 100 in the present embodiment will be described. In addition to the APCM and the APCL, the laser driver 405A executes the APCH for controlling the value of the current supplied to the light-emitting portion 301 such that the light quantity received by the photosensor 204 is Ph (Ph=Pm×2). The laser driver 405A holds a current value Ih corresponding to the light quantity Ph as a control result of the APCH. The value of the switching current Isw is calculated by subtracting the value of the bias current Ib from the current value Ih.

Laser Driver

Next, a configuration of the laser drivers 405A and 405B for executing the aforementioned APCM, APCL, and APCH will be described. FIG. 6 is a diagram showing an internal configuration of the laser driver 405A. Since the internal configuration of the laser driver 405B is the same as that of the laser driver 405A, a description of the laser driver 405B will be omitted.

The laser driver 405A includes a mode channel decoder 633. The laser driver 405A also includes LVDS receivers 601 to 616 and drive units 617 to 632 corresponding to the light-emitting portions 301 to 316, respectively. The drive units 617 to 632 each includes an OR circuit 643, a transistor 644, and a switching current source 645. The laser driver 405A includes a voltage output unit 636 that outputs a target voltage Vm (comparison signal) corresponding to the light quantity Pm to the light-emitting portions 301 to 316, a voltage output unit 637 that outputs a target voltage Vl (comparison signal) corresponding to the light quantity Pl to the light-emitting portions 301 to 316, and a voltage output unit 638 that outputs a target voltage Vh (comparison signal)

corresponding to the light quantity Ph to the light-emitting portions 301 to 316. Furthermore, the laser driver 405A includes a selector 640, a comparator 641, an EVR 642, the mode channel decoder 633, a selector 634, and a register 635.

First, the mode channel decoder 633 will be described. The mode channel decoder 633 switches the operation mode of the laser driver 405A to one of the DIS mode, the VDO mode, the OFF mode, the ACC mode, and the APC mode, based on a mode select signal, a channel select signal, and an IC select signal from the CPU 401.

The CPU 401 outputs the IC select signal (icsel_0) to the mode channel decoder 633. The mode channel decoder 633 controls the laser driver 405A so as to be in the APC mode, based on the IC select signal from the CPU 401. Note that there are cases where the laser driver 405A is not in the APC mode at a timing at which the APC is to be executed. In this case, the mode channel decoder 633 provided in the laser driver 405B controls the laser driver 405B so as to be in the APC mode, based on the IC select signal from the CPU 401. That is to say, the operation mode of either one of the laser driver 405A and the laser driver 405B selectively transitions to the APC mode based on the IC select signal at a timing of executing the APC.

The CPU 401 outputs a mode select signal group (ms0, ms1, ms2, ms3) and a channel select signal group (ch0, ch1, ch2, ch3) to the mode channel decoder 633. The mode channel decoder 633 generates one of APC mode signal (apcH_on1 to 16, apcM_on1 to 16, apcL_on1 to 16) based on the mode select signal group and the channel select signal group from the CPU 401.

The mode channel decoder 633 outputs the APC mode signal to the laser driver 405A in the APC mode. An APC mode signal apcH_on is a signal that causes the laser driver 405A to execute the APCH. An APC mode signal apcM_on is a signal that causes the laser driver 405A to execute the APCM. An APC mode signal apcL_on is a signal that causes the laser driver 405A to execute the APCL.

The mode channel decoder 633 outputs the APC mode signals apcH_on, apcM_on, and apcL_on to the light-emitting portions 301 to 316 at different timings (i.e., sets the APC mode signals to the H level, which indicates that the APC is to be executed). That is to say, the mode channel decoder 633 generates the APC mode signals apcH_on1 to 16, apcM_on1 to 16, and apcL_on1 to 16, i.e., a total of 48 APC mode signals, and sets one of the 48 APC mode signals to the H level. The laser drivers 405A and 405B execute light quantity control with respect to the light-emitting portion corresponding to the APC mode signals output by the mode channel decoders 633 provided in the laser drivers 405A and 405B.

FIG. 7A is a table showing the mode select signals, the channel select signals, and the IC select signals for various operation modes that are output by the CPU 401. In FIG. 7A, "DIS" indicates the DIS mode, and "ACC" indicates the ACC mode. "VDO" indicates the VDO mode, and "OFF" indicates the OFF mode. "APCH", "APCM", and "APCL" indicate the APCH mode, the APCM mode, and the APCL mode, respectively.

"ic" indicates the IC select signals icsel_0 and icsel_1. When the input mode select signal indicates execution of the APC and the IC select signal is at the L level, the laser drivers 405A and 405B enter a state of being able to execute the APCH, APCM, and APCL. Only one photosensor 204 is provided that is common to the laser drivers 405A and 405B. Accordingly, only one of the laser drivers 405A and 405B is selected by the IC select signal, and only the selected laser driver can use the signals from the photosensor 204.

In each operation mode, the control is performed based on a combination of the mode select signals (ms0, ms1, ms2, ms3) shown in FIG. 7A. Note that [1] in the table indicates all combinations other than a combination of the mode select signals in the DIS mode, the ACC mode, the APCH mode, the APCM mode, and the APCL mode. [2] in the table means that control status is fixed without depending on the IC select signal and the channel select signals (ch0, ch1, ch2, ch3). [*] in the table indicates a combination of the channel select signals (ch0, ch1, ch2, ch3) shown in FIG. 7B. e1 to e16 in FIG. 7B correspond to the light-emitting portions 301 to 316, respectively.

Here, an exemplary method for referencing the table will be described. For example, assume the case where the combination of the mode select signals (ms3, ms2, ms1, ms0) output by the CPU 401 is (L, L, H, L), and the combination of the channel select signals (ch0, ch1, ch2, ch3) is (L, H, L, L). In this case, the laser drivers 405A and 405B execute the APCM with respect to the light-emitting portion 305 corresponding to e5. The mode channel decoder 633 sets only the APC mode signal apcM_on5 corresponding to the light-emitting portion 305 among the 48 APC mode signals to the H level, and sets the other APC mode signals to the L level, based on the mode select signals and the channel select signals.

Next, the drive units 617 to 632 will be described. The drive units 617 to 632 are provided so as to correspond to the light-emitting portions 301 to 316, respectively, and supply a drive current to the respective light-emitting portions. Since the drive units 617 to 632 have the same configuration, an internal configuration of the drive unit 617 will be described as an example.

The drive unit 617 includes an M-hold capacitor 647, an L-hold capacitor 648, an Ib calculation unit 649, a selector 650, and a bias current source 651. The drive unit 617 further includes an OR circuit 643, a transistor 644, a switching current source 645, an H-hold capacitor 646, an Isw calculation unit 670, and a correction unit 671.

As shown in FIG. 6, the bias current source 651 and the switching current source 645 are connected to the light-emitting portion 301. The bias current source 651 is a drawing current source that draws the bias current Ib from a voltage source VCC. The switching current source 645 is a drawing current source that draws the switching current Isw from VCC. In the VDO mode, the OFF mode, the ACC mode, and the APC mode, the bias current Ib is supplied to the light-emitting portion 301 by the bias current source 651.

The Ib calculation unit 649 is connected to the M-hold capacitor 647 and the L-hold capacitor 648. The Ib calculation unit 649 calculates the value of the bias current Ib based on a control result of the APCM (voltage of the M-hold capacitor 647) and a control result of the APCL (voltage of the L-hold capacitor 648).

The correction unit 671 is a module that corrects, using the correction coefficient α, the switching current Isw determined by the Isw calculation unit 670. The correction coefficient α is designated by the CPU 401 through the register 635. The correction unit 671 controls the switching current source 645 such that the determined switching current Isw×α flows through the light-emitting portion 301. Note that, upon the correction unit 671 receiving a VDO mode signal, or upon the LVDS receiver 601 outputting image data, the correction unit 671 determines whether or not Isw×α has been reset, and if reset, the correction unit 671 re-determines Isw×α. The correction unit 671 has a function of determining or detecting whether or not the VDO mode signal or an ACC mode signal has been received, or a function of determining or detecting whether or not the LVDS receiver 601 has output image data. If Isw×α has not been reset, the correction unit 671 does not execute the redetermination. Note that, upon any of the APC modes being executed, the correction unit 671 resets Isw×α that the correction unit 671 holds. This is for reflecting the latest value determined by any of the APC modes in the switching current Isw. Thus, the correction unit 671 determines and holds Isw×α when the VDO mode signal or image data is first input. In particular, in the present embodiment, the correction unit 671 determines Isw×α as a result of the operation mode temporarily transitioning to the VDO mode during the non-image period existing before the image period. Accordingly, when the operation mode transitions to the VDO mode during the image period, Isw×α has already been fixed, and accordingly the correction unit 671 does not determine Isw×α. A delay in calculation in the initial part of the image period is thereby eliminated, and a delay in the rising of the light quantity can be suppressed.

Next, the LVDS receivers 601 to 616, and the OR circuit 643, the transistor 644, and the switching current source 645 included in the drive unit 617 will be described. Since the LVDS receivers 601 to 616 have the same configuration, the LVDS receiver 601 will be described as an example. The LVDS receiver 601 receives a differential signal, which is image data, from the CPU 401. The LVDS receiver 601 outputs a PWM signal to the OR circuit 643, based on the differential signal.

The OR circuit 643 has two terminals, the PWM signal from the LVDS receiver 601 is input to one of these terminals, and the APC mode signal (apcH_on1) from the mode channel decoder 633 is input to the other terminal. If at least one of the output signal from the LVDS receiver 601 and apcH_on1 is at the H level, the OR circuit 643 outputs an H-level signal, and if both the output signal from the LVDS receiver 601 and apcH_on1 are at the L level, the OR circuit 643 outputs an L-level signal.

The output of the OR circuit 643 is connected to a base terminal of the transistor 644. A collector terminal of the transistor 644 is connected to the light-emitting portion 301, and an emitter terminal of the transistor 644 is connected to the switching current source 645. Upon the H-level signal being output from the OR circuit 643, the collector terminal and the emitter terminal of the transistor 644 enter a state of being conductive with respect to each other, and the switching current source 645 draws the switching current Isw from VCC. The switching current Isw for causing a laser beam to be emitted is thereby supplied to the light-emitting portion 301. Note that, upon an L-level signal being output from the OR circuit 643, the collector terminal and the emitter terminal of the transistor 644 enter a state of not being conductive with respect to each other.

The selector 640 selects one of an output signal Vh, which is an APCH target voltage output by the voltage output unit 636, an output signal Vm, which is an APCM target voltage output by the voltage output unit 637, and an output signal Vl, which is an APCL target voltage output by the voltage output unit 638. The selector 640 outputs the output signal Vh, Vm, or Vl to the comparator 641 by performing the selection based on the APC mode signal (apcH_on1 to 16, apcM_on1 to 16, apcL_on1 to 16) output from the mode channel decoder 633. Note that the output signals Vh, Vm, and Vl are voltages corresponding to the third, first, and second light quantities (target light quantities) Ph, Pm, and Pl, respectively.

The selector 634 includes a terminal 634com connected to the comparator 641, a grounded terminal 634gnd, and terminals 634-1 to 634-48. As shown in FIG. 6, the terminal 634-1 is connected to the H-hold capacitor 646 in the drive unit 617. The terminal 634-2 is connected to the M-hold capacitor 647 in the drive unit 617. Furthermore, the terminal 634-3 is connected to the L-hold capacitor 648 in the drive unit 617. The other terminals 634-4 to 48 are each similarly connected to the H-hold capacitor, the M-hold capacitor, or the L-hold capacitor in the respective drive units.

The APC mode signals (apcH_on1 to 16, apcM_on1 to 16, apcL_on1 to 16), the OFF mode signal, the VDO mode signal, and the ACC mode signal are selectively input to the selector 634 from the mode channel decoder 633. When the VDO mode signal, the OFF mode signal, and the ACC mode signal are input, the selector 634 connects the terminal 634com to the terminal 634gnd. The drive unit 617 thereby enters a state where the H-hold capacitor 646, the M-hold capacitor 647, and the L-hold capacitor 648 are not charged and discharged. On the other hand, when the APC mode signals (apcH_on1 to 16, apcM_on1 to 16, apcL_on1 to 16) are input, the selector 634 connects the terminal corresponding to an H-level APC mode signal among the terminals 634-1 to 634-48 to the terminal 634com.

The APC mode signals (apcH_on1, apcM_on1, apcL_on1), the VDO mode signal, the OFF mode signal, and the ACC mode signal are input to the selector 650 provided in the drive unit 617 from the mode channel decoder 633. Corresponding signals are also input to the selectors 650 in the drive units 618 to 632. Each selector 650 includes a terminal 650-1 connected to the M-hold capacitor 647, a terminal 650-2 connected to the Ib calculation unit 649, a terminal 650-3 connected to the L-hold capacitor 648, and a terminal 650-4 connected to the bias current source 651.

When the APC mode signal apcH_on1, the VDO mode signal, the OFF mode signal, and the ACC mode signal are input, the selector 650 connects the terminal 650-2 to the terminal 650-4. When apcM_on1 is input, the selector 650 connects the terminal 650-1 to the terminal 650-4. When apcL_on1 is input, the selector 650 connects the terminal 650-3 to the terminal 650-4.

The EVR (Electrical variable resistor) 642 is a variable resistor that can vary the resistance value using the register 635. apcH_on1 to 16, apcM_on1 to 16, and apcL_on1 to 16 are input to the EVR 642. The EVR 642 references a light quantity adjustment table based on an input value that is input to the register, and corrects a detection signal from the photosensor 204 in accordance with a reference value (scale factor adjustment coefficient/gain). In the light quantity adjustment table of the EVR 642, scale factor adjustment coefficients that have been measured in advance at the time of shipping from the factory and correspond to optical light-collection efficiency are registered in the form of table data. At an APC preparation stage, the optical light-collection efficiency of a PD sensor and each laser element is set in the register 635. In the EVR 642, a table is selected in accordance with the APC mode signals (apcH_on1 to 16, apcM_on1 to 16, apcL_on1 to 16).

Light Quantity Control APCM

The CPU 401 controls the mode select signal and the channel select signal in order to execute the APCM for controlling the voltage of the M-hold capacitor 647. The mode channel decoder 633 outputs the APC mode signal apcM_on1 for executing the APCM for the light-emitting portion 301 to the selector 634, the selector 640, and the selector 650, based on the mode select signal and the channel select signal from the CPU 401.

The selector 634 connects the terminal 634com to the terminal 634-2 in accordance with the APC mode signal apcM_on1 being input. The selector 640 selects a comparison signal Vm that is output from the voltage output unit 637 in accordance with the APC mode signal apcM_on1 being input, and inputs the signal to the comparator 641. The selector 650 connects the terminal 650-1 to the terminal 650-4 in accordance with the APC mode signal apcM_on1 being input.

Upon the selector 650 connecting the terminal 650-1 to the terminal 650-4, the bias current source 651 draws a current having a value based on the voltage of the M-hold capacitor 647 from VCC. With this current, the light-emitting portion 301 emits a laser beam. The laser beam emitted from the light-emitting portion 301 is incident on the photosensor 204, and the photosensor 204 outputs a detection signal corresponding to the light quantity of the laser beam.

The comparator 641 compares a comparison signal Vm from the selector 640 that is a voltage corresponding to a predetermined light quantity (target light quantity) Pm with an amplification signal Samp (Vamp) from the EVR 642 that is an amplification circuit, and outputs a signal based on a comparison result to the selector 634. Specifically, if Vamp>Vm, the light quantity of the laser beam incident on the photosensor 204 is larger than the light quantity Pm, and accordingly the comparator 641 discharges the M-hold capacitor 647. As the discharging of the M-hold capacitor 647 is continued, the light quantity of the laser beam incident on the photosensor 204 decreases and approaches the light quantity Pm. The comparator 641 holds the voltage of the M-hold capacitor 647 in accordance with Vamp=Vm (or Vamp≈Vm) being achieved.

On the other hand, if Vamp<Vm, the light quantity of the laser beam incident on the photosensor 204 is smaller than the light quantity Pm, and accordingly the comparator 641 charges the M-hold capacitor 647. As the charging of the M-hold capacitor 647 is continued, the light quantity of the laser beam incident on the photosensor 204 increases and approaches the light quantity Pm. The comparator 641 holds the voltage of the M-hold capacitor 647 in accordance with Vamp=Vm (or Vamp≈Vm) being achieved.

If Vamp=Vm, the light quantity of the laser beam incident on the photosensor 204 coincides with the light quantity Pm, and accordingly the comparator 641 holds the voltage of the M-hold capacitor 647 in this state.

Thus, in the APCM, the light quantity of the laser beam that is emitted from the light-emitting portion 301 and is incident on the photosensor 204 is controlled so as to achieve the target light quantity, by controlling the voltage of the M-hold capacitor 647.

Light Quantity Control APCL

Next, the CPU 401 controls the mode select signal in order to execute the APCL for controlling the voltage of the L-hold capacitor 648. The mode channel decoder 633 outputs the APC mode signal apcL_on1 for executing the APCL for the light-emitting portion 301 to the selector 634, the selector 640, and the selector 650, based on the mode select signal from the CPU 401.

The selector 634 connects the terminal 634com to the terminal 634-3 in accordance with the APC mode signal apcL_on1 being input. The selector 640 selects a comparison signal Vl that is output from the voltage output unit 638 in accordance with the APC mode signal apcL_on1 being input, and inputs the signal to the comparator 641. The selector 650 connects the terminal 650-3 to the terminal 650-4 in accordance with the APC mode signal apcL_on1 being input.

Upon the selector 650 connecting the terminal 650-3 to the terminal 650-4, the bias current source 651 draws a current having a value based on the voltage of the L-hold capacitor 648 from VCC. With this current, the light-emitting portion 301 emits a laser beam. The laser beam emitted from the light-emitting portion 301 is incident on the photosensor 204, and the photosensor 204 outputs a detection signal corresponding to the light quantity of the laser beam.

The comparator 641 compares a comparison signal Vl from the selector 640 that is a voltage corresponding to a predetermined light quantity (target light quantity) Pl with an amplification signal Samp (Vamp) from the EVR 642, and outputs a signal based on a comparison result to the selector 634. Specifically, if Vamp>Vl, the light quantity of the laser beam incident on the photosensor 204 is larger than the light quantity Pl, and accordingly the comparator 641 discharges the L-hold capacitor 648. As the discharging of the L-hold capacitor 648 is continued, the light quantity of the laser beam incident on the photosensor 204 decreases and approaches the light quantity Pl. The comparator 641 holds the voltage of the L-hold capacitor 648 in accordance with Vamp=Vl (or Vamp Vl) being achieved.

On the other hand, if Vamp<Vl, the light quantity of the laser beam incident on the photosensor 204 is smaller than the light quantity Pl, and accordingly the comparator 641 charges the L-hold capacitor 648. As the charging of the L-hold capacitor 648 is continued, the light quantity of the laser beam incident on the photosensor 204 increases and approaches the light quantity Pl. The comparator 641 holds the voltage of the L-hold capacitor 648 in accordance with Vamp=Vl (or Vamp≈Vl) being achieved.

If Vamp=Vl, the light quantity of the laser beam incident on the photosensor 204 coincides with the light quantity Pl, and accordingly the comparator 641 holds the voltage of the L-hold capacitor 648 in this state.

In this manner, in the APCL, the light quantity of the laser beam that is emitted from the light-emitting portion 301 and is incident on the photosensor 204 is controlled so as to achieve the light quantity Pl, by controlling the voltage of the L-hold capacitor 648.

Calculation of Bias Current

The Ib calculation unit 649, which is a bias current control unit, calculates the value of the bias current Ib based on an APCM control result and an APCL control result, in accordance with completion of the above-described APCM and APCL. That is to say, the Ib calculation unit 649 calculates the value of the bias current Ib using the above-described calculation method, based on the voltage of the M-hold capacitor 647 and the voltage of the L-hold capacitor 648.

If the APCM and the APCL have not been performed for the light-emitting portion 301, the selector 650 connects the terminal 650-2 to the terminal 650-4. The Ib calculation unit 649 calculates the value of the bias current Ib and outputs a control signal, which is a calculation result, to the bias current source 651, as a result of the terminal 650-2 and the terminal 650-4 being connected to each other. The bias current source 651 draws the bias current having a value based on the control signal from the Ib calculation unit 649 from VCC. The value of the bias current is also similarly controlled for the other light-emitting portions 302 to 332.

Light Quantity Control APCH

The value of the switching current Isw is defined by the voltage of the H-hold capacitor 646. The CPU 401 executes the APCH for controlling the voltage of the H-hold capacitor 646, in order to control the value of the switching current Isw. The APCH for the light-emitting portion 301 is executed in a state where the bias current Ib is supplied to the light-emitting portion 301.

The CPU 401 controls the mode select signal in order to execute the APCH for controlling the voltage of the M-hold capacitor 647. The mode channel decoder 633 outputs the APC mode signal apcH_on1 for executing the APCH for the light-emitting portion 301 to the selector 634, the selector 640, the selector 650, and the OR circuit 643, based on the mode select signal from the CPU 401.

The selector 634 connects the terminal 634com to the terminal 634-1 in accordance with the APC mode signal apcH_on1 being input. The selector 640 selects a comparison signal Vh that is output from the voltage output unit 636 in accordance with the APC mode signal apcH_on1 being input, and inputs the signal to the comparator 641. The selector 650 connects the terminal 650-2 to the terminal 650-4 in accordance with the APC mode signal apcH_on1 being input.

The bias current Ib is supplied to the light-emitting portion 301 as a result of the terminal 650-2 and the terminal 650-4 of the selector 650 being connected to each other. The transistor 644 enters a conductive state in accordance with the APC mode signal apcH_on1 being input to the OR circuit 643, and the switching current source 645 supplies a current to the light-emitting portion 301. The light-emitting portion 301 emits a laser beam by the current being supplied thereto from the switching current source 645 in a state where the bias current Ib is supplied thereto. The laser beam emitted from the light-emitting portion 301 is incident on the photosensor 204, and the photosensor 204 outputs a detection signal corresponding to the light quantity of the laser beam.

The comparator 641 compares a comparison signal Vh from the selector 640 that is a voltage corresponding to a predetermined light quantity (target light quantity) Ph with an amplification signal Samp (Vamp) from the EVR 642, and outputs a signal based on a comparison result to the selector 634. Specifically, if Vamp>Vh, the light quantity of the laser beam incident on the photosensor 204 is larger than the light quantity Ph, and accordingly the comparator 641 discharges the H-hold capacitor 646. As the discharging of the H-hold capacitor 646 is continued, the light quantity of the laser beam incident on the photosensor 204 decreases and approaches the light quantity Ph. The comparator 641 holds the voltage of the H-hold capacitor 646 in accordance with Vamp=Vh (or Vamp Vh) being achieved. On the other hand, if Vamp<Vh, the light quantity of the laser beam incident on the photosensor 204 is smaller than the light quantity Ph, and accordingly the comparator 641 charges the H-hold capacitor 646. As the charging of the H-hold capacitor 646 is continued, the light quantity of the laser beam incident on the photosensor 204 increases and approaches the light quantity Ph. The comparator 641 holds the voltage of the H-hold capacitor 646 in accordance with Vamp=Vh (or Vamp≈Vh) being achieved. If Vamp=Vh, the light quantity of the laser beam incident on the photosensor 204 coincides with the light quantity Ph, and accordingly the comparator 641 holds the voltage of the H-hold capacitor 646 in this state. Thus, in the APCH, the light quantity of the laser beam that is emitted from the light-emitting portion 301 and is incident on the photosensor 204 is controlled so as to achieve a third light quantity (target light quantity) Ph, by controlling the voltage of the H-hold capacitor 646.

APC Mode and ACC Mode

Figure 8A:
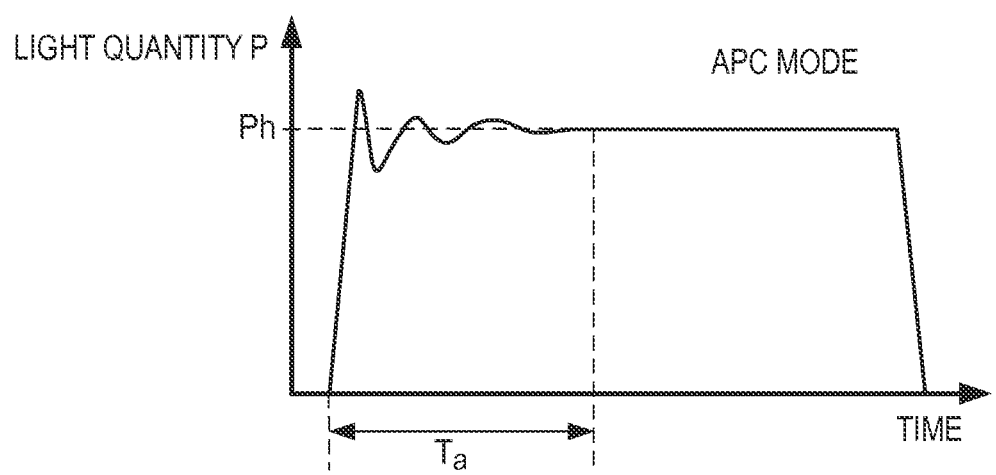
FIGS. 8A and 8B are diagrams illustrating an APC mode and an ACC mode.
Figure 8B:
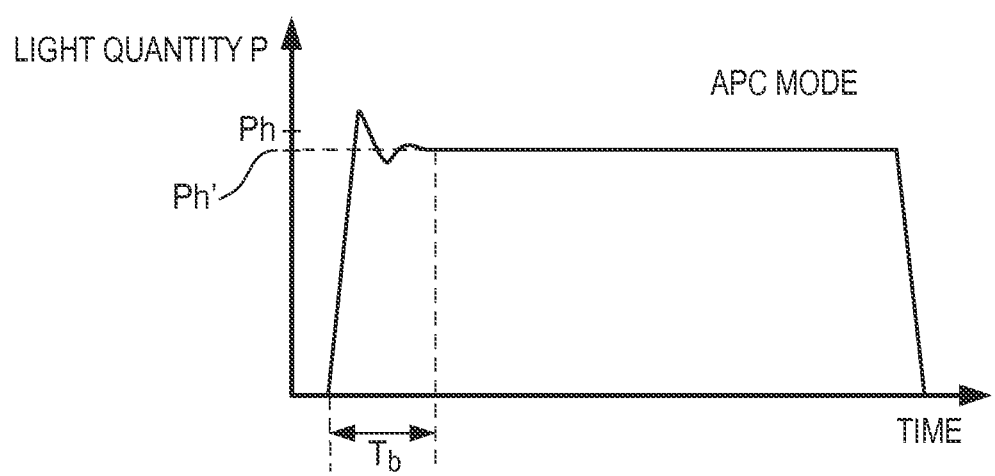

Next, the APC mode and the ACC mode in the image forming apparatus 100 (optical scanning devices 104) in the present embodiment will be described with reference to FIGS. 8A and 8B. FIGS. 8A and 8B are diagrams showing exemplary temporal changes of a light quantity P of a laser beam emitted from a light-emitting portion in the case where the light quantity control for a light-emitting portion (one of the light-emitting portions 301 to 332) is performed in the APC mode and the ACC mode. FIG. 8A shows a temporal change of the light quantity of the laser beam emitted from the light-emitting portion in the case of executing, as the APC, the above-described APCH using the third light quantity Ph as a target light quantity. FIG. 8B shows a temporal change of the light quantity of the laser beam emitted from the light-emitting portion in the case of causing the light-emitting portion to emit light in the ACC mode after a lapse of a predetermined time after execution of the APCH.

As shown in FIG. 8A, the light quantity P of the laser beam emitted from the light-emitting portion set in the APC mode is controlled so as to achieve the target light quantity Ph, by executing the APC. In the APC mode, since the charging and discharging of the H-hold capacitor 646 are repeated, the light quantity P is not stabilized for a certain period (Ta) after the light-emitting portion starts to emit light. Upon the voltage of the H-hold capacitor 646 converging on the voltage corresponding to the target light quantity Ph, the light quantity P enters a stable state at the target light quantity Ph. This period Ta is fixed depending on the capacitance or the like of the H-hold capacitor 646, and is, in general, several μs. The target light quantity Ph is set to a fixed value, and the value of the target light quantity Ph is 0.2 mW in the present embodiment, as mentioned above. Assume that the stable state at the target light quantity Ph is a state indicating a light quantity variation of ±0.5% from 0.2 mW. Note that the value of the target light quantity Ph and a parameter indicating the stable state at the target light quantity Ph are not limited to those described above, and are values determined by design specifications or the like of the semiconductor laser 200 and the image forming apparatus 100.

On the other hand, for a light-emitting portion that is set in the ACC mode, the light quantity control (ACC) is performed by supplying the drive current based on the voltage of the H-hold capacitor 646 in a holding state to the light-emitting portion. When the H-hold capacitor 646 is in a state of having been charged, as shown in FIG. 8B, the light quantity of the laser beam emitted by the light-emitting portion that is set in the ACC mode quickly changes to the light quantity corresponding to the voltage of the H-hold capacitor 646. In FIG. 8B, by the execution of the ACC, the light quantity P enters a stable state at a light quantity Ph' after a lapse of time Tb after the light-emitting portion starts to emit light. This light quantity Ph' corresponds to the voltage of the H-hold capacitor 646. The voltage of the H-hold capacitor 646 decreases with a lapse of the time due to the discharging of the charge from this capacitor, and as a result, the light quantity Ph' decreases from the target light quantity Ph with a lapse of time. However, as is understood from FIGS. 8A and 8B, in the case of the ACC mode, the light quantity P of the laser beam emitted from the light-emitting portion can be caused to converge (stabilize) on a fixed light quantity within a shorter time period (Tb<Ta) than in the case of the APC mode.

Cyclic APC

Cyclic APC will be described using FIGS. 9A to 9D and 10. FIGS. 9A, 9B, 9C, and 9D show four modes with different numbers of cycles. One of the modes is selected by the CPU 401. In FIGS. 9A, 9B, 9C, and 9D, H, M, and L indicate the APCH, the APCM, and the APCL, respectively. The suffixes of H, M, and L indicate a light-emitting portion.

Figures 9A, 9B, 9C, 9D:
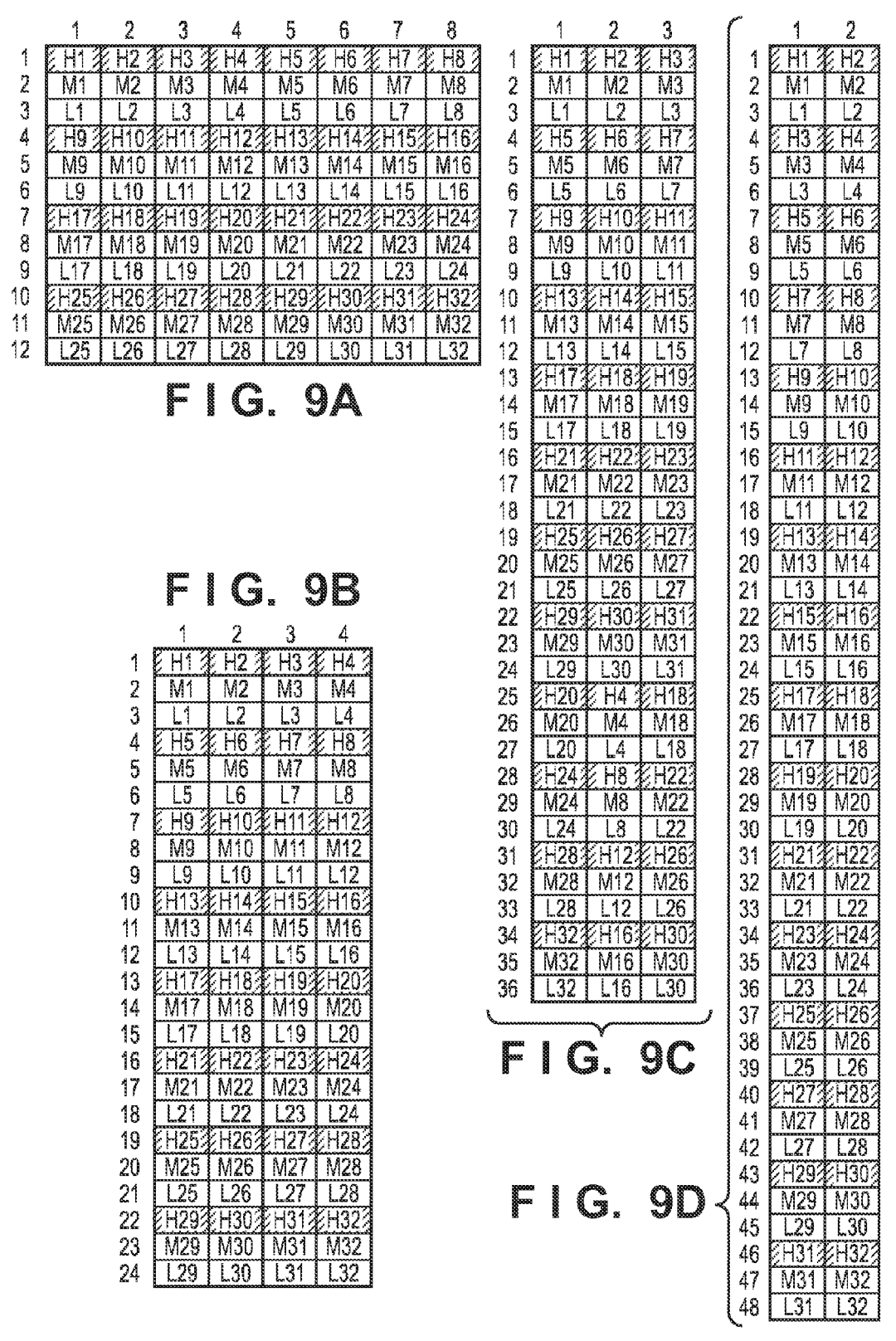

Numbers 1 to 8 are given on the horizontal axis in FIG. 9A, and correspond to eight types of APC that are sequentially switched during one scan. Numbers 1 to 12 are given on the vertical axis in FIG. 9A, and indicate 12 scan cycles. Accordingly, FIG. 9A indicates that the APC is executed with respect to three light quantities of each of the 32 light-emitting portions. In particular, FIG. 9A indicates that 8 types of APC are executed during one scan by executing 96 types of individual APC while distributing them to 12 cycles (12 scans).

Since the numbers of cycles in FIGS. 9B, 9C, and 9D are different, the numbers of types of APC during one scan are different, but the total number of times that the APC is executed is 96, which is the same as in FIG. 9A. FIG. 9B shows an example of 24 cycles, FIG. 9C shows an example of 36 cycles, and FIG. 9D shows an example of 48 cycles.

FIG. 10 is a table showing APC operation modes that the laser driver 405A in the present embodiment handles, and corresponds to a function table of the mode channel decoder 633. Note that a description of items common to FIG. 7A will be omitted. In FIG. 10, the number of types of the ACC mode increases to three, namely ACCH, ACCM, and ACCL, as compared with FIG. 7A. The ACCH indicates a forced lighting state in which light-emission is performed with a current obtained by multiplying the value of the current determined in the APCH by a correction coefficient αn. The ACCM indicates a forced lighting state in which light-emission is performed with a current obtained by multiplying the value of the current determined in the APCM by the correction coefficient αn. The ACCL indicates a forced lighting state in which light-emission is performed with a current obtained by multiplying the value of the current determined in the APCL by the correction coefficient αn. Note that n is a number for identifying the light-emitting portion. PD indicates a state of a terminal that is provided in the laser driver 405A and to which the photosensor 204 is connected. If PD is ON, it means that the laser driver 405A is in a state of being able to receive a detection signal from the photosensor 204. If PD is HI-Z, it means that the laser driver 405A is in a state of being unable to receive a detection signal from the photosensor 204.

In FIG. 10, ch0 to ch3 are used as signals for selecting a beam when in the APC mode and the ACC mode, and are don't care when in the other modes. In FIG. 10, [3] means that any one of all combinations of possible values taken as ch3 to ch0 is set.

Since the control targets of the APCH in one driver are 16 light-emitting portions and there are cases where PD=HI-Z, the APCH has 17 operation modes. Similarly, the APCM, the APCL, the ACCH, the ACCM, and the ACCL each have 17 modes. The DIS, the VDO, and the OFF each have one mode. Accordingly, a total of 106 modes exist. The DIS, the VDO, and the OFF are common to the two drivers. Accordingly, a total of 206 modes exist in the laser drivers 405A and 405B.

The CPU 401 starts to measure time upon an interruption occurring due to the BD signal, and controls the laser drivers 405A and 405B while sequentially switching an APC signal group so as to select one of the 206 modes in accordance with the order shown in the cycle table in FIG. 9B.

Isw Calculation Timing

The Isw calculation unit 670 calculates Isw using an equation Ih−Ith=Isw, and controls the switching current source 645 such that the switching current Isw having the calculated value flows. The timing of updating Isw is when Ih has been fixed in the APCH and Ith has been calculated after completion of the APCL and the APCM. Upon Ith being fixed, Isw is updated by subtracting Ith from Ih. After Ith is calculated, the operation mode transitions to the VDO mode without performing the APCH in some cases. In this case, the Isw calculation unit 670 calculates Isw using Ih held in the H-hold capacitor 646, when image data, which is an LVDS signal, is first input in one scan cycle. Latest Ih detected in the previous APCH is held in the H-hold capacitor 646.

Laser Power Control

If the sensitivity of the photosensitive drum varies depending on the environmental temperature or the like, the density of the toner image formed on the photosensitive drum varies. For this reason, the CPU 401 detects the sensitivity of the photosensitive drum using the sensitivity sensor 450 before image formation, and controls the light quantity of each light-emitting portion. Specifically, the CPU 401 sets the correction coefficient αn for each light-emitting portion that corresponds to the sensitivity in the registers 635 in the laser drivers 405A and 405B. When in the ACC mode or the VDO mode, the correction unit 671 multiplies Isw by the correction coefficient α, controls the switching current source 645 so as to draw the switching current that is Isw×α, and drives the light-emitting portion 301. The calculation of Isw×α is executed at a timing of the start of the ACC, or at a timing of first input of the LVDS signal during one scan cycle after transitioning to the VDO mode.

Control Sequence

FIG. 11 shows the BD signals for five scans and changes of the operation mode in the cyclic APC in the present embodiment. As shown in FIG. 11, five BD signals 8001, 8011, 8013, 8015, and 8017 exist, and each BD signal is a starting point of a scan cycle. Upon the BD signal being input from the beam sensor 210 and an interruption occurring, the CPU 401 measures an elapsed time after the input of the BD signal, using the timer 451. Upon the time measured by the timer 451 reaching a predetermined timing of switching the operation mode as shown in FIG. 11, the CPU 401 controls the signal lines 407A, 407B, 408, and 409, which constitute the APC signal group, to switch the operation mode. In FIG. 11, the operation mode transitions to the VDO mode during a first period 8002, and image formation is executed. During a second period 8003, the operation mode transitions to the OFF mode, and the light-emitting portions are prohibited from emitting light. A third period 8010 is a period during which the APC can be performed, and the above-described cyclic APC is executed. Here, the APC is sequentially executed for 32 light-emitting portions in 24 cycles, for the sake of convenience of the description. A fourth period 8020 is a period of transitioning to the OFF mode, and is a second light emission prohibition period. Immediately before the input of the BD signal 8011, the CPU 401 causes the operation mode to transition to the ACCH mode for forcing the light-emitting portion 301 to emit light so as to achieve the light quantity Ph, in order to acquire the BD signal. The CPU 401 ends the ACCH mode immediately after the input of the BD signal 8011, and causes the light-emitting portion 301 to turn off the light.

FIG. 12 is an enlarged diagram of one scan cycle. In FIG. 12, the APCM for sequentially obtaining the drive current Im for four light-emitting portions with ch0, ch1, ch2, and ch3 is executed during the third period 8010. As shown in FIG. 12, the length of one scan cycle is 500 µs. The length of the first period 8002 is 300 µs. The length of the third period 8010 is 40 µs (10 µs per 1 ch). These numeric values are only examples.

Figure 13A:
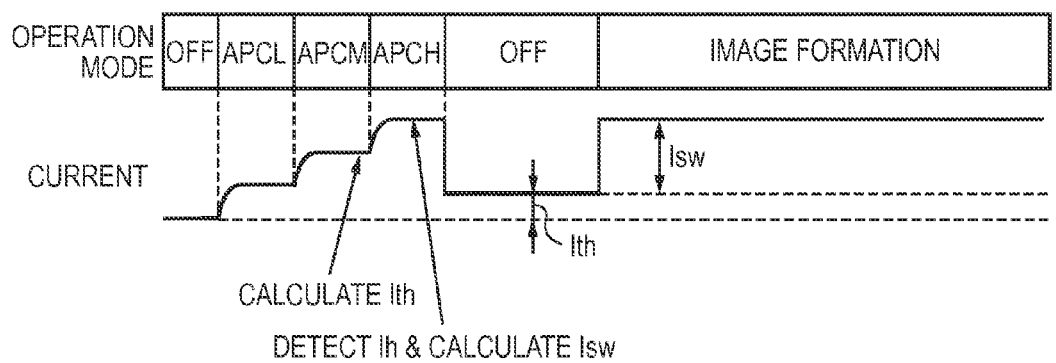
FIGS. 13A to 13C are diagrams illustrating a delay in the rising of drive current with calculation of a switching current.
Figure 13B:
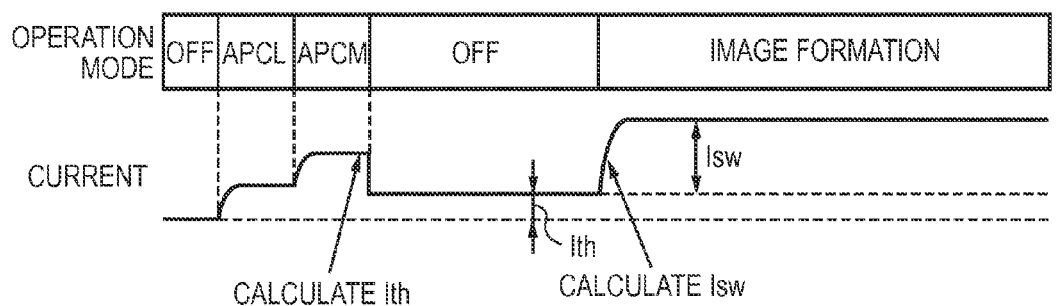
Figure 13C:
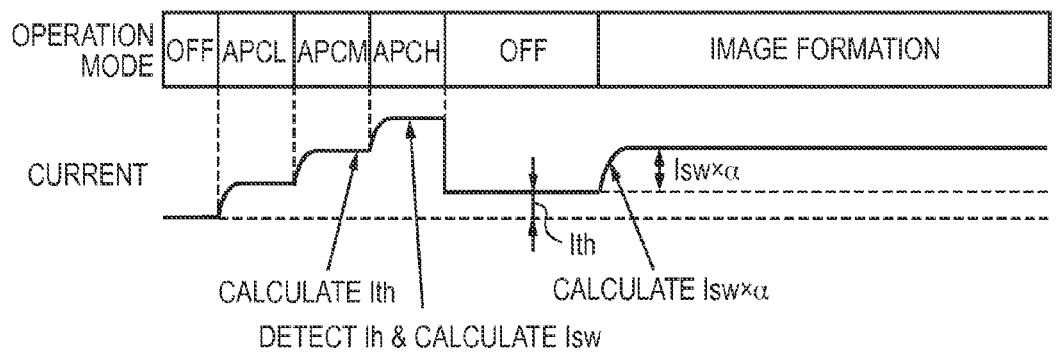

As shown in FIG. 13A, in order to calculate Isw, it is necessary to execute the APCM and the APCL to calculate Ith, and further execute the APCH to detect Ih. However, as the number of light-emitting portions increases, it is difficult to execute the above APC within one scan cycle. It is also conceivable to execute the APCM and the APCL to calculate Ith during the non-image period, and calculate Isw at the time of transitioning to the VDO mode during the image period, as shown in FIG. 13B. However, in this case, the rising of the drive current is blunted due to the calculation time of Isw, and the rising of the light quantity also delays. In the case of correcting Isw using the correction coefficient α as shown in FIG. 13C as well, the rising of the drive current is blunted due to the calculation time of Isw×α, and the rising of the light quantity also delays. Thus, in the case where the operation mode transitions to the VDO mode after executing the APCM or the APCL, fixation of Isw takes time, and therefore the responsiveness of the drive current deteriorates at an early stage of the VDO mode.

In this regard, in the present embodiment, a VDO mode execution period is provided in the non-image period immediately after the APCM and the APCL within one scan cycle, as shown in FIG. 12. In particular, the length of the VDO mode execution period is 2 ps. The CPU 401 inputs image data to the laser driver during this execution period, thereby once driving the light-emitting portion before an original timing of starting execution of the VDO mode during the image period. The CPU 401 can fix the switching current Isw×α corrected in accordance with the correction coefficient α by executing the VDO mode. Note that, in the present embodiment, the image data supplied to the laser driver is image data with which all light-emitting portions can be simultaneously driven.

Figure 14:
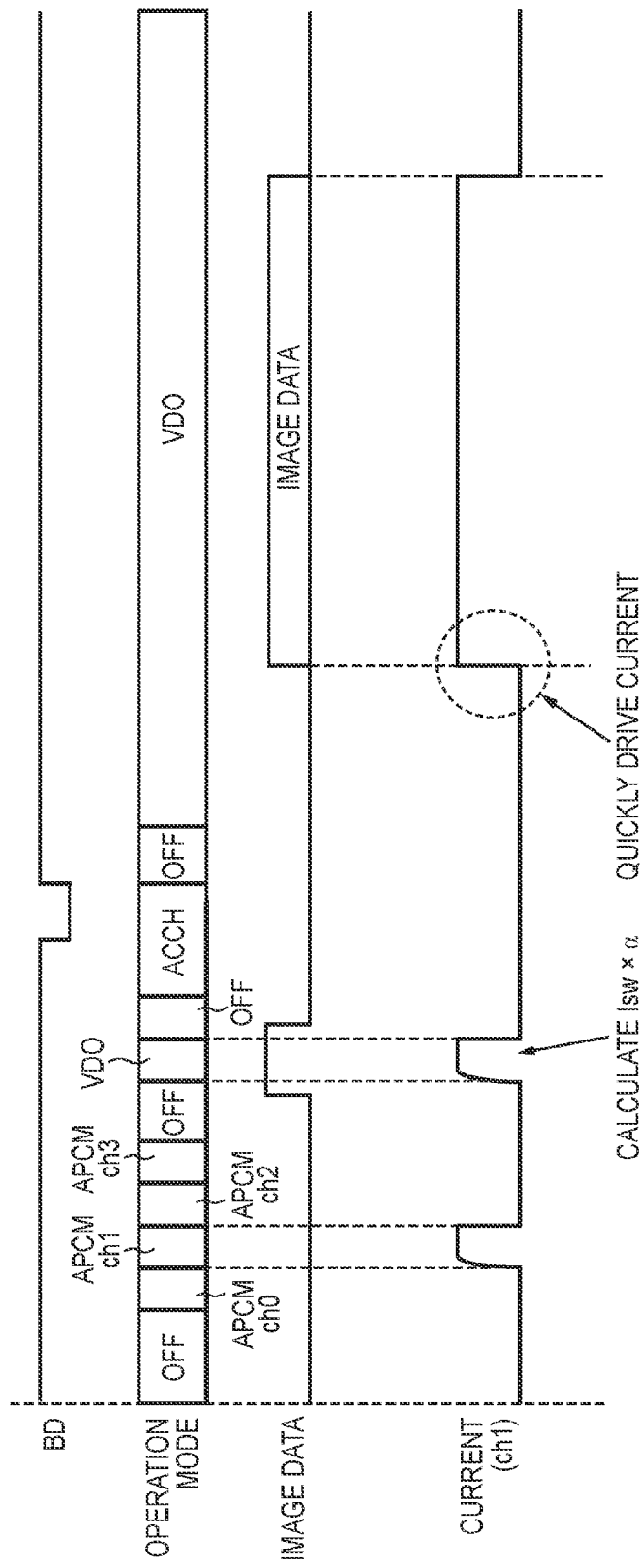
FIG. 14 is a diagram illustrating an exemplary operation mode in one scan cycle.

FIG. 14 is a diagram showing an exemplary drive current that flows through the light-emitting portion assigned to ch1 in the sequence shown in FIG. 12. The operation mode transitions to the VDO mode after the APCM is performed during the non-image period. In the section of the VDO mode in this non-image period, the correction unit 671 calculates Isw×α using a latest correction coefficient α that is set in advance by the CPU 401, and drives the light-emitting portion 301 with the drive current corresponding to Isw×α. A correction coefficient α that is set in the register 635 is used by the correction unit 671. Isw×α can thereby be calculated in advance before the operation mode transitions to the VDO mode in the image period. Since the calculation of Isw×α is thereby not necessary when the operation mode transitions to the VDO mode in the image period, the current can be quickly caused to flow through the light-emitting portion.

Others

In FIG. 5, an example of calculating Ith from the relationship between the light quantity and the current value that are acquired by executing the APCM and the APCL has been described. If the current-light quantity characteristic (I-L characteristic) is linear, Ith can be calculated with sufficient accuracy from the relationship between the light quantity and the current value that are acquired by executing the APCH and the APCL. By not performing the APCM, the number of cycles in the cyclic APC can be reduced. Furthermore, the amount of leak current from the M-hold capacitor 647 can be reduced, and therefore the effect of improving APC accuracy will also be achieved.

Figure 15:
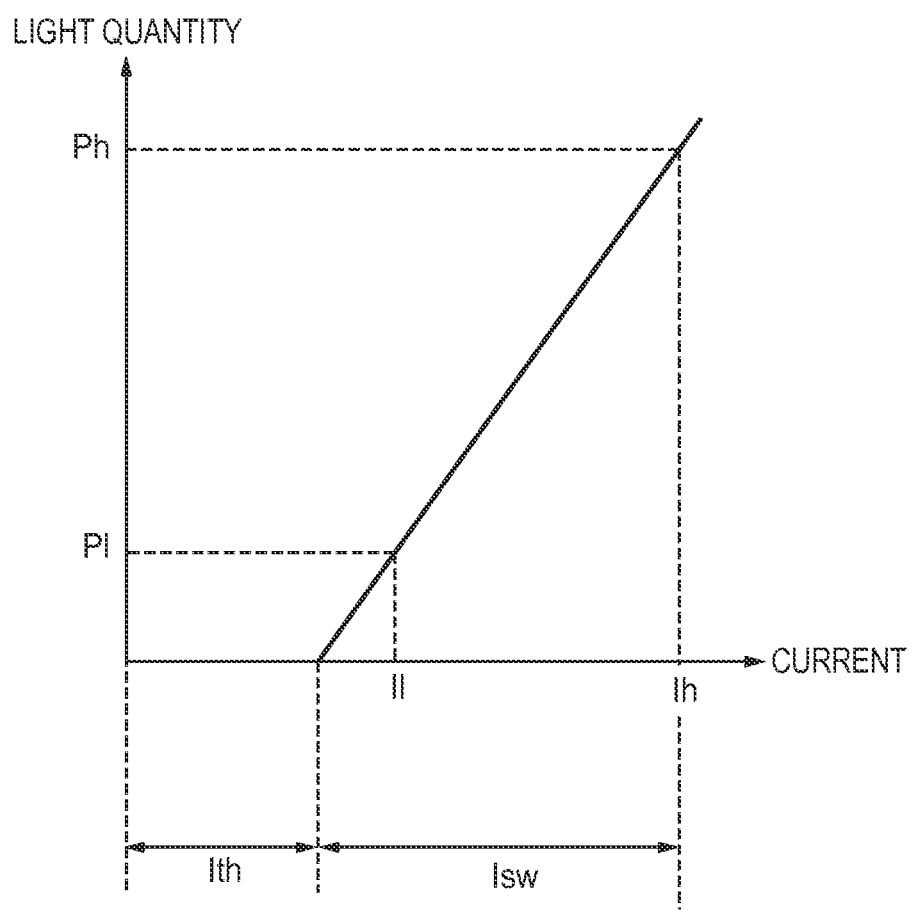
FIG. 15 is a diagram showing a relationship between a drive current and a light quantity.
Figure 16:
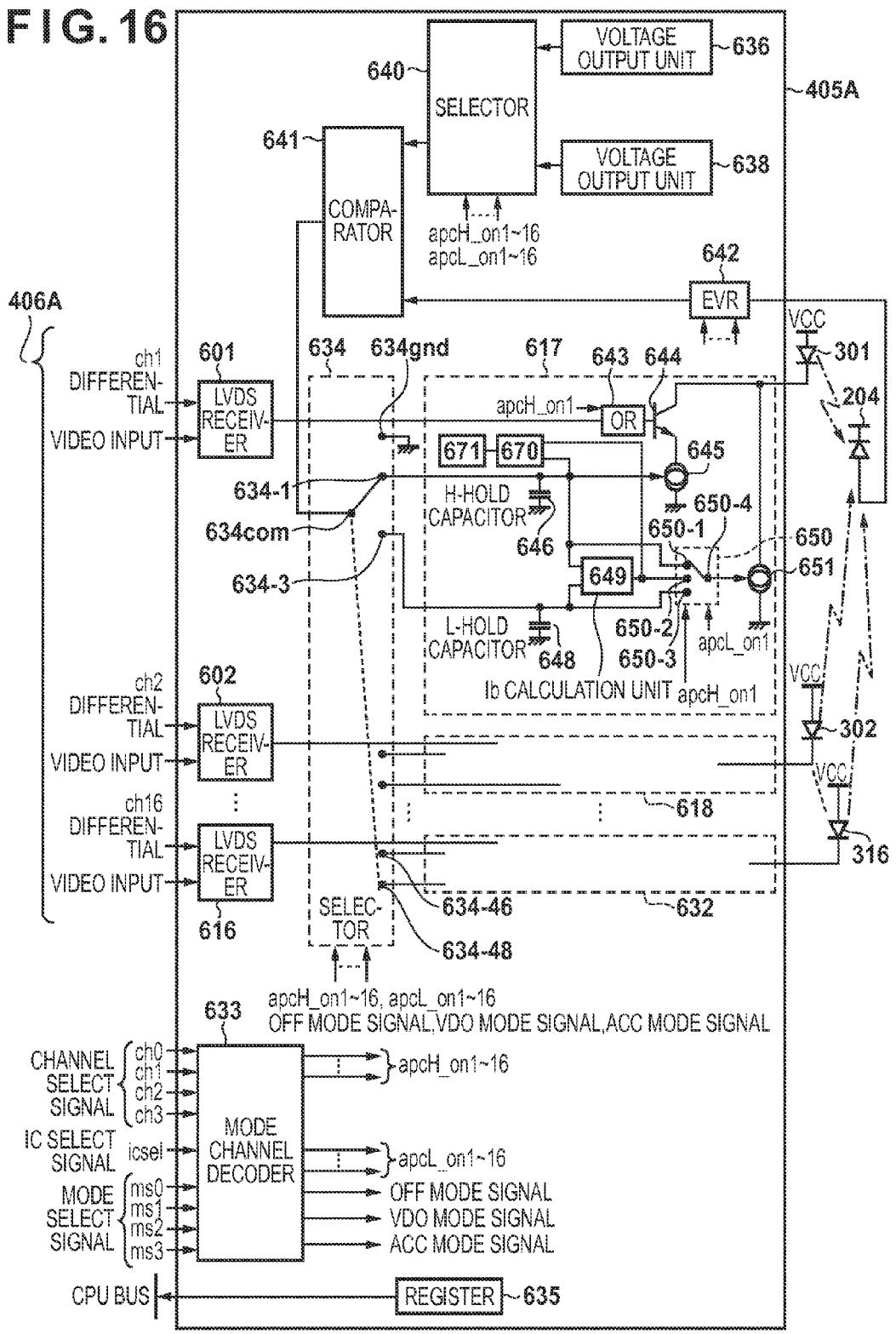
FIG. 16 is a diagram showing an exemplary laser driver.

FIG. 15 is a diagram showing a concept of biasing APC with a light source whose I-L characteristic is linear. The light quantity Ph is determined at the time of shipping from the factory, and is stored in a nonvolatile storage device. The light quantity Pl is a light quantity corresponding to one fourth of the light quantity Ph. The current Ih is a current adjusted so as to obtain the light quantity Ph. The current Il is a current adjusted so as to obtain the light quantity Pl. The Ib calculation unit 649 obtains a linear function that passes through the coordinates (current Ih, light quantity Ph) and the coordinates (current Il, light quantity Pl), and calculates the current with which the light quantity is 0 as the threshold current Ith, based on this linear function. The Ib calculation unit 649 calculates the bias current Ib by multiplying the threshold current Ith by a coefficient. As mentioned above, the Isw calculation unit 670 determines the switching current Isw by subtracting the bias current Ib from the current Ih. Also, the correction unit 671 corrects the switching current Isw by multiplying it by the correction coefficient α that is set in the register 635. As shown in FIG. 16, a function relating to the APCM can be omitted. As shown in FIG. 17, 16 cycles of the APC can be performed. As is understood by comparison with FIG. 9B, the number of cycles can be reduced to two thirds.

In the description of the above embodiment, it is assumed that all light-emitting portions are simultaneously caused to turn on the light in the section of the VDO mode in the non-image period. However, the same effect can also be achieved by causing only a light-emitting portion that is a target of the APCM or the APCL to turn on the light in the same scan cycle.

In the above embodiment, the image period is sandwiched by the first half of the non-image period and the latter half of the non-image period, and the latter half of the non-image period includes the first section in which the APC mode is executed and the second section in which the VDO mode for determining the corrected switching current is executed. For this reason, a rapid rising of the light quantity during the image period in an $i^{th}$ scan cycle is achieved by fixing the switching current during the latter half of the non-image period in an $i-1^{th}$ scan cycle. However, the first half of the non-image period may include the first section and the second section. That is to say, a rapid rising of the light quantity during the image period in the $i^{th}$ scan cycle may be achieved by fixing the switching current in the first half of the non-image period in the $i^{th}$ scan cycle.

Summary

According to the present embodiment, the laser driver 405A functions as a determination unit that determines the drive current for performing switch-driving of the plurality of light-emitting portions, based on a detection signal output by the photosensor 204 with respect to light beams that are individually output by the plurality of light-emitting portions during the non-image period. Also, the CPU 401 and the LVDS receivers 601 to 616 function as generation units that generate image data in the second section of the non-image period. The laser driver 405A determines a first drive current Ih for achieving a predetermined first target light quantity Ph during the non-image period, and also determines the standby current caused to flow through the plurality of light-emitting portions at the time of standby, by controlling the drive current so as to obtain a predetermined second target light quantity Pl. Furthermore, the Isw calculation unit 670 and the correction unit 671 in the laser driver 405A determine the drive current Isw corresponding to the first drive current Ih and the standby current, upon image data being generated in the second section of the non-image period. Thus, the image forming apparatus fixes the switching current Isw at an early stage by temporarily transitioning to the VDO mode in which an image can be formed even during the non-image period. Accordingly, when the operation mode transitions to the VDO mode during the image period, processing for fixing the switching current is not necessary, and a delay in the rising of the drive current during the image period can be reduced. Note that the image data generated in the second section of the non-image period is not an image formation target, but is simply for fixing the drive current Isw. Also, although the image data is supplied to the light-emitting portions and the light-emitting portions output light beams in the second section of the non-image period, the photosensitive drum is not exposed. This is because the light beams scan portions where the photosensitive drum does not exist during the non-image period.

The laser driver 405A may have an Isw calculation unit 670 that subtracts the standby current from the first drive current Ih, and a correction unit 671 that determines the drive current Isw by correcting a subtraction result of the Isw calculation unit 670 using the correction coefficient α corresponding to the sensitivity of the photosensitive member. The Isw calculation unit 670 may determine the switching current Isw upon the bias current Ib being determined as the standby current in the first section of the non-image period. This is because the switching current Isw can be calculated if the standby current is obtained. As described using FIG. 14 and the like, the correction unit 671 determines the drive current Isw that has been corrected using the correction coefficient α in the second section of the non-image period. Since the switching current Isw is thereby appropriately corrected in accordance with the sensitivity of the photosensitive drum, unevenness in the density or the like will be able to be reduced.

The sensitivity sensor 450 may be used as a detection unit for detecting the sensitivity of the photosensitive member. The CPU 401 may set the correction coefficient α corresponding to the sensitivity detected by the sensitivity sensor 450 in the correction unit 671 through the register 635. The switching current Isw is thereby appropriately corrected even if the sensitivity of the photosensitive drum varies.

As described using FIG. 5, the Ib calculation unit 649 may obtain a linear function indicating a relationship between the light quantity and the drive current based on a second drive current Il necessary for obtaining a second target light quantity Pl and a third drive current Im necessary for obtaining a third target light quantity Pm that is larger than the second target light quantity Pl, and determine the standby current based on this linear function. As described using FIG. 15, the Ib calculation unit 649 may obtain a linear function indicating a relationship between the light quantity and the drive current based on the first drive current Ih necessary for obtaining the first target light quantity Ph and the second drive current Il necessary for obtaining the second target light quantity Pl, and determine the standby current based on this linear function. In order to thus fix the I-L characteristic, at least two coordinates need only be fixed. However, in the case where the I-L characteristic is not linear, the standby current will be able to be accurately determined by fixing more coordinates.

As described using FIG. 14, the laser driver 405A may determine the drive current Isw for performing switch-driving of the plurality of light-emitting portions, based on the first drive current Ih (for achieving the first target light quantity Ph) determined during the non-image period in the $i-1^{th}$ scan cycle, and the standby current determined during the non-image period in the $i^{th}$ scan cycle. The switching current source 645, which is a drive unit, may drive the plurality of light-emitting portions during the image period in an $i+1^{th}$ scan cycle, using the drive current Isw determined for each of the light-emitting portions. That is to say, the drive current Isw does not need to be calculated at the beginning of the image period in the $i+1^{th}$ scan cycle, and the light quantity can be rapidly raised.

The laser driver 405A may determine the drive current Isw for performing switch-driving of the plurality of light-emitting portions during the non-image period in the $i^{th}$ scan cycle, based on the first drive current Ih that is determined during the non-image period in a scan cycle before the $i-1^{th}$ scan cycle and is for achieving the first target light quantity Ph, and the standby current determined during the non-image period in the $i^{th}$ scan cycle. That is to say, the standby current and the switching current Isw are determined during the first half of the non-image period provided before the image period, and the calculation of the switching current Isw during the image period is not necessary. By the switching current source 645 driving the plurality of light-emitting portions during the image period in the $i^{th}$ scan cycle using the drive current Isw determined for each of the light-emitting portions, the light quantity can be rapidly raised at the beginning of the image period of the $i^{th}$ scan cycle.

Upon image data being generated by the CPU 401 in the second section of the non-image period, the laser driver 405A may cause the Isw calculation unit 670 and the correction unit 671 to determine the drive current Isw for performing switch-driving of each of the plurality of light-emitting portions, by causing all light-emitting portions to turn on the light. However, it is not essential to cause all light-emitting portions to turn on the light, and a light-emitting portion that is a target of the APC in the first section need only be also caused to turn on the light in the second section.

The mode channel decoder 633 functions as a switching unit that switches the operation mode of the laser driver 405A to one of a first mode (VDO mode) in which an image can be formed by causing the plurality of light-emitting portions to turn on the light, a second mode (OFF mode etc.) in which the light-emitting portions are caused to turn off the light, and a third mode (APC mode) in which the light quantity of each of the light-emitting portions is controlled by individually causing the light-emitting portions to turn on the light. Upon the operation mode transitioning to the APC mode in the first section of the non-image period, the laser driver 405A determines the standby current to be caused to flow through the plurality of light-emitting portions at the time of standby, by controlling the drive current so as to obtain the predetermined second target light quantity Pl. Furthermore, upon the operation mode transitioning to the VDO mode in the second section of the non-image period, the laser driver 405A may determine the drive current Isw for performing switch-driving of the plurality of light-emitting portions, based on the first drive current Ih for achieving the predetermined first target light quantity Ph and the standby current determined in the first section. Thus, the laser driver 405A can be caused to transition to the VDO mode in the second section of the non-image period by supplying the VDO mode signal or the like, without generating image data, and the switching current Isw can be fixed at an early stage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-105666, filed May 21, 2014 which is hereby incorporated by reference wherein in its entirety.

What is claimed is:

1. An image forming apparatus comprising:
   a light source including a plurality of light-emitting portions each of which outputs a light beam for exposing a photosensitive member;
   a light reception unit configured to receive a light beam individually output by the plurality of light-emitting portions, and output a detection signal corresponding to a light quantity of the received light beam;
   a deflection unit configured to deflect the light beam so as to scan on the photosensitive member;
   a drive unit configured to perform switch-driving of the plurality of light-emitting portions by supplying a drive current to each of the plurality of light-emitting portions in accordance with image data in an image period in which the light beam deflected by the deflection unit scans on the photosensitive member in order to form an image on the photosensitive member, and supply a drive current for controlling a light quantity of the plurality of light-emitting portions in a first section of a non-image period in which the light beam deflected by the deflection unit does not scan on the photosensitive member, the image period and the non-image period constituting a scan cycle;
   a determination unit configured to determine a value of the drive current for performing switch-driving of the plurality of light-emitting portions, based on the detection signal output by the light reception unit with respect to the light beam that is individually output by the plurality of light-emitting portions during the non-image period; and
   a generation unit configured to generate image data in a second section of the non-image period,
   wherein the determination unit is further configured to determine a value of a bias current caused to flow through at least the plurality of light-emitting portions regardless of image data during the image period by determining a value of a first drive current for setting a light quantity of a light beam incident on the light reception unit during the non-image period to a first target light quantity, and determining a value of a second drive current for setting a light quantity of the light beam incident on the light receiving unit to a second target light quantity that is different from the first target light quantity, and the determination unit further determines the value of the drive current for performing switch-driving of the plurality of light-emitting portions, based on the image data, the drive current corresponding to the first drive current and the bias current, upon the image data being generated by the generation unit in the second section of the non-image period,
   wherein the determination unit further includes a subtraction unit configured to subtract the value of the bias current from the value of the first drive current, and a correction unit configured to determine the value of the drive current by correcting a subtraction result of the subtraction unit, using a correction coefficient corresponding to a sensitivity of the photosensitive member, upon the value of the bias current being determined in the first section of the non-image period, the subtraction unit determines the value of the drive current for performing switch-driving of the plurality of light-emitting portions, by subtracting the value of the bias current from the value of the first drive current, and
   the correction unit determines the value of the drive current corrected using the correction coefficient in the second section of the non-image period.

2. The image forming apparatus according to claim 1, further comprising:
   a detection unit configured to detect the sensitivity of the photosensitive member; and
   a setting unit configured to set the correction coefficient corresponding to sensitivity detected by the detection unit in the correction unit.

3. The image forming apparatus according to claim 1, wherein the determination unit is further configured to obtain a linear function indicating a relationship between a light quantity and a drive current based on the value of the second drive current necessary for obtaining the second target light quantity and a value of a third drive current necessary for obtaining a third target light quantity that is larger than the second target light quantity, and determine the value of the bias current based on the linear function.

4. The image forming apparatus according to claim 1, wherein the determination unit is further configured to obtain a linear function indicating a relationship between a light quantity and a drive current based on the value of the second drive current necessary for obtaining the second target light quantity and a value of a third drive current necessary for obtaining a third target light quantity that is larger than the second target light quantity, and determine the value of the bias current based on the linear function.

5. The image forming apparatus according to claim 1, wherein the determination unit is further configured to obtain a linear function indicating a relationship between a light quantity and a drive current based on the value of the drive current and the value of the second drive current necessary for obtaining the second target light quantity, and determine the value of the bias current based on the linear function.

6. An image forming apparatus comprising:
   a light source including a plurality of light-emitting portions each of which outputs a light beam for exposing a photosensitive member;
   a light reception unit configured to receive a light beam individually output by the plurality of light-emitting portions, and output a detection signal corresponding to a light quantity of the received light beam;
   a deflection unit configured to deflect the light beam so as to scan on the photosensitive member;
   a drive unit configured to perform switch-driving of the plurality of light-emitting portions by supplying a drive current to each of the plurality of light-emitting portions in accordance with image data in an image period in which the light beam deflected by the deflection unit scans on the photosensitive member in order to form an image on the photosensitive member, and supplying a drive current for controlling a light quantity of the plurality of light-emitting portions in a first section of a non-image period in which the light beam deflected by the deflection unit does not scan on the photosensitive member, the image period and the non-image period constituting a scan cycle;
   a determination unit configured to determine a value of the drive current for performing switch-driving of the plurality of light-emitting portions, based on the detection signal output by the light reception unit with respect to the light beam that is individually output by the plurality of light-emitting portions during the non-image period; and a switching unit configured to switch an operation mode of the drive unit to one of a first mode in which an image can be formed by causing the plurality of light-emitting portions to turn on the light, a second mode in which the plurality of light-emitting portions are caused to turn off the light, and a third mode in which a light quantity of each of the plurality of light-emitting portions is controlled by individually causing the plurality of light-emitting portions to turn on the light, wherein the determination unit determines, upon the operation mode transitioning to the third mode in the first section of the non-image period, a value of a bias current caused to flow through the plurality of light-emitting portions at the time of standby, by controlling the drive current such that a light quantity of a light beam incident on the light reception unit is a second target light quantity, and further determines, upon the operation mode transitioning to the first mode in a second section of the non-image period, a value of a drive current for performing switch-driving of the plurality of light-emitting portions, based on a value of a first drive current for setting the light quantity of the light beam incident on the light reception unit to a first target light quantity and the value of the bias current determined in the first section.

7. The image forming apparatus according to claim 6, wherein the determination unit further has a subtraction unit configured to subtract the value of the bias current from the value of the first drive current, and a correction unit configured to determine the value of the drive current for performing switch-driving of the plurality of light-emitting portions, by correcting a subtraction result of the subtraction unit, using a correction coefficient corresponding to a sensitivity of the photosensitive member, upon the value of the bias current being determined, the subtraction unit determines the value of the drive current for performing switch-driving of the plurality of light-emitting portions, by subtracting the value of the bias current from the value of the first drive current, and the correction unit determines the value of the drive current corrected using the correction coefficient in the second section of the non-image period.

8. An image forming apparatus comprising:

a photosensitive member;

a laser light source including a light-emitting portion which outputs a laser light by being supplied with an electrical current;

a deflection unit configured to deflect the laser light output from the light-emitting portion such that the laser light scans on the photosensitive member;

a light reception unit located at a position where the light reception unit can receive the laser light output from the light-emitting portion, and configured to output a signal according to a reception light amount; and a drive unit configured to supply a bias current to the light-emitting portion and configured to supply a switching current to the light-emitting portion to which the bias current has been supplied based on image data, wherein the drive unit is further configured to form a feedback loop between the light-emitting portion and the light reception unit, is further configured to perform a first light amount control, a second light amount control and a third light amount control for setting the electrical current supplied to the light-emitting portion based on the signal input from the light reception unit via the feedback loop, is further configured to set a value of the bias current which is included in the electrical current, based on a result of the first light amount control and a result of the second light amount control, and to set a value of the switching current which is included in the electrical current, by multiplying a correction coefficient with a current value obtained by subtracting the value of the bias current from a result of the third light amount control, and is further configured to supply the switching current at a time period between a first period during which the first light amount control, the second light amount control and the third light amount control are performed and a second period during which the laser light scans on the photosensitive member in the scanning period.

* * * * *